(12) United States Patent
Ito et al.

(10) Patent No.: US 7,121,405 B2
(45) Date of Patent: Oct. 17, 2006

(54) DISC PACKAGE

(75) Inventors: Tatsuichi Ito, Tokyo (JP); Kazuhito Morita, Tokyo (JP); Masaki Oyama, Tokyo (JP); Takayoshi Miyashita, Tokyo (JP); Yoshinori Saito, Tokyo (JP)

(73) Assignee: Taiyo Yuden Co., Ltd., (JP)

( * ) Notice: Subject to any disclaimer, the term of this patent is extended or adjusted under 35 U.S.C. 154(b) by 512 days.

(21) Appl. No.: 10/301,610

(22) Filed: Nov. 22, 2002

(65) Prior Publication Data

US 2004/0099548 A1   May 27, 2004

(51) Int. Cl.
*B65D 85/57* (2006.01)
*B65D 85/02* (2006.01)

(52) U.S. Cl. .................. 206/308.1; 206/303; 206/445; 206/493

(58) Field of Classification Search ................ 206/303, 206/310, 307.1, 308.1, 445, 493, 499; 312/9.9, 312/9.46, 9.64; 211/41.12, 41.18, 40; D6/407, D6/632, 633; 294/158; 360/133; 369/291.1; 215/318, 330; 220/293, 302, 780, 784
See application file for complete search history.

(56) References Cited

U.S. PATENT DOCUMENTS

| | | | | |
|---|---|---|---|---|
| 2,678,861 A | * | 5/1954 | Funk | ......................... 312/9.52 |
| 3,165,220 A | * | 1/1965 | Haynes | ......................... 215/252 |
| 4,502,598 A | * | 3/1985 | Wartenbergh | ............ 206/308.3 |
| 4,516,678 A | * | 5/1985 | Fotiadis et al. | .......... 206/308.3 |
| 4,700,839 A | * | 10/1987 | Fujii | ........................ 206/308.3 |
| 5,348,885 A | * | 9/1994 | Labarthe | .................. 435/305.4 |
| 5,553,711 A | * | 9/1996 | Lin et al. | .................... 206/710 |
| 5,611,448 A | * | 3/1997 | Chen | ........................ 220/4.27 |
| 6,112,894 A | * | 9/2000 | Kikuchi et al. | .......... 206/308.1 |
| 6,119,872 A | * | 9/2000 | Flores et al. | ................... 211/40 |
| 6,286,684 B1 | * | 9/2001 | Brooks et al. | .............. 206/710 |
| 2003/0098251 A1 | * | 5/2003 | Yang | ......................... 206/303 |

FOREIGN PATENT DOCUMENTS

GB    2273493 A  *  6/1994

* cited by examiner

*Primary Examiner*—Mickey Yu
*Assistant Examiner*—J. Gregory Pickett
(74) *Attorney, Agent, or Firm*—Bacon & Thomas PLLC

(57) ABSTRACT

The present invention relates to a disc package having a structure in which a cover can be fixed on a base by simply pressurizing the cover with respect to the base in a base shaft axial direction and, at the same time, the cover can be prevented from being accidentally separated from the base while the disc package is being transported. Further, in the disc package, a cover once fixed on a base can be separated therefrom by rotating the cover along the circumference of the base in any direction, i.e., in either a clockwise or a counterclockwise direction. Furthermore, an end portion of a shaft can be fitted into a concave portion of a cover even in case the end portion of the shaft is not aligned with the concave portion of the cover.

18 Claims, 33 Drawing Sheets

FIG.22A
FIG.22B
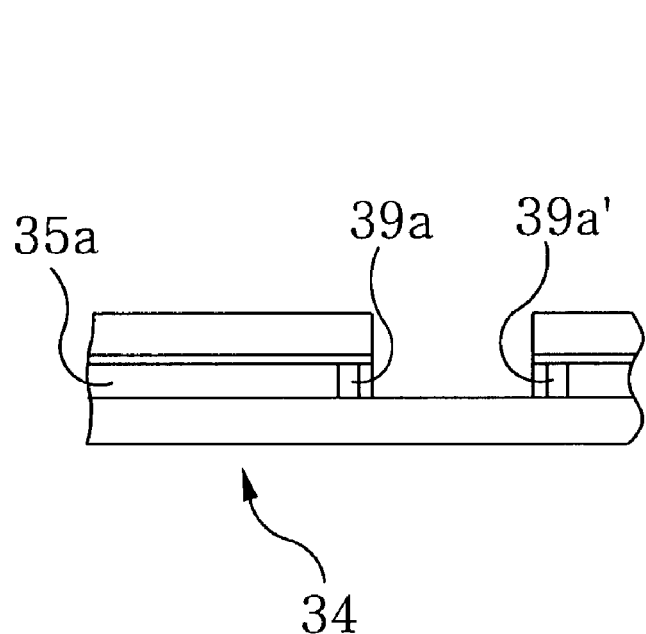
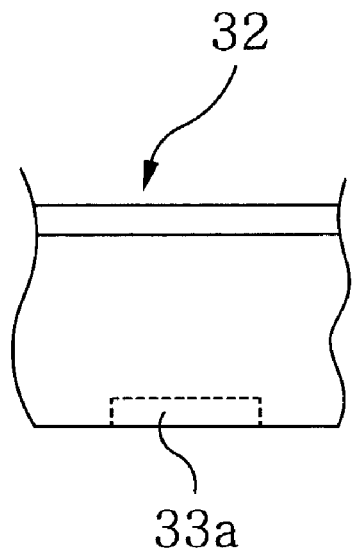
FIG.23
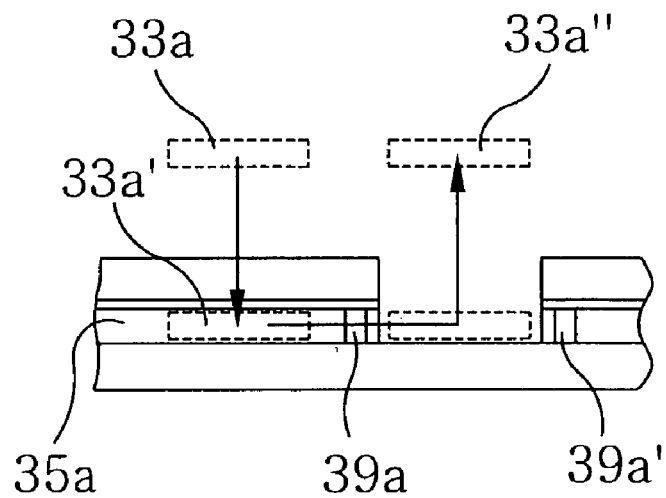

FIG.39A
FIG.39B
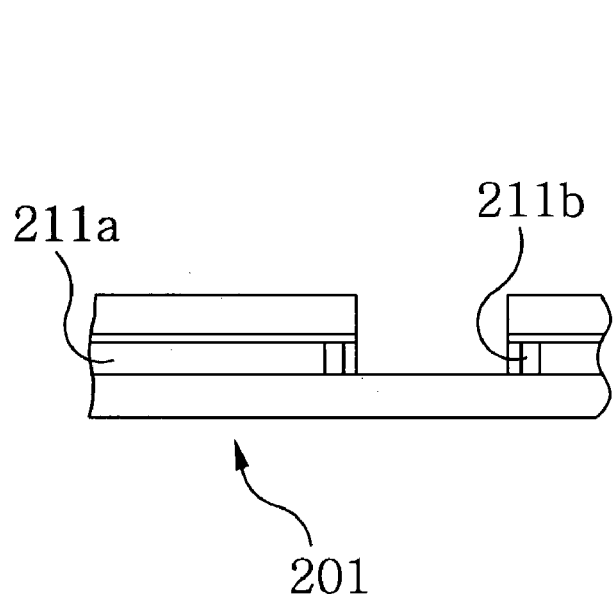
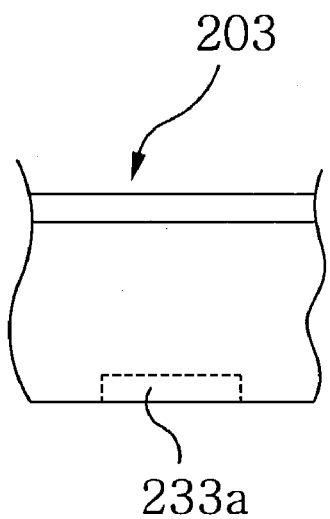
FIG.40
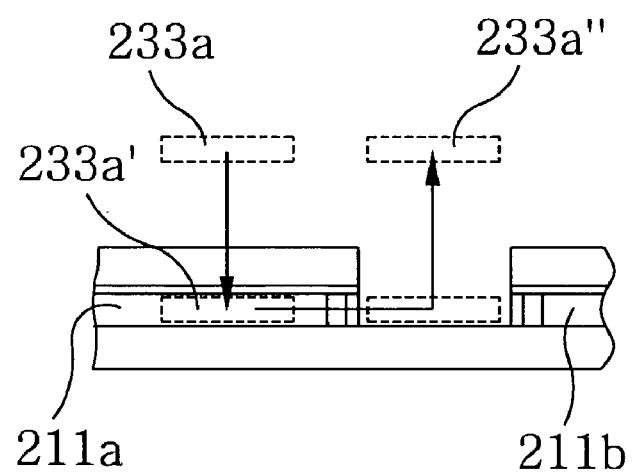

DISC PACKAGE

FIELD OF THE INVENTION

The present invention relates to a disc package; and, more particularly, to a disc package for storing therein various types of discs, e.g., a read-only disc such as a CD and a DVD, a recordable disc such as a CD-R and a DVD-R, a rewritable disc such as a CD-RW and a DVD-RW, and the like.

BACKGROUND OF THE INVENTION

A conventional disc package capable of storing therein a plurality of discs includes a base on which the plurality of discs are stacked, a bucket-shaped cover for covering the discs mounted on the base, and a male screw cap for fixing the cover on the base.

Installed at the center of a top surface of the base is a shaft to be inserted through a center hole of each disc. Formed on an upper end portion of the shaft is a female screw hole corresponding to the screw of the cap. The cover has a screw-through hole formed on a center portion of the upper surface thereof.

A disc packaging process using the above-described disc package is provided as follows. The shaft is inserted through a center hole of each disc, so that the discs are stacked on the base. Then, the discs stacked on the base are covered with the cover, and the screw of the cap is inserted into the female screw hole of the shaft through the screw-through hole, thereby firmly fixing the cover on the base.

In the disc package described above, a troublesome screwing operation is required in order to fix the cover on the base. Accordingly, the costs for the disc packaging are increased.

Another conventional disc package includes a base for stacking thereon the plurality of discs and a bucket-shaped cover for covering the discs mounted on the base. In such a disc package, the cover is pressurized onto the base along a shaft axial direction to be mounted thereon. A disc package of this type is disclosed in Japanese Utility Model Application No. 2-125170 (Japanese Utility Model Laid-Open Publication No. 4-84189).

In such a disc package described in FIG. 7, the cover can be mounted on the base simply by being pressurized onto the base along the shaft axial direction. However, since a locking structure for locking the cover onto the base is not provided, the cover mounted on the base may be separated therefrom due to vibrations while the disc package is being transported.

Meanwhile, in such a disc package described in FIGS. 1 to 6, a cover and a base are formed in such a manner that they cannot be connected to and separated from each other unless the cover is rotated along the circumference of the base. Further, since a locking structure is prepared, the cover once fixed on the base can be prevented from being separated therefrom due to vibrations while the disc package is being transported. However, the disc package has a disadvantage in that the cover cannot be fastened to the base simply by being pressurized onto the base. Further, the cover cannot be mounted on the base unless it is precisely aligned along the circumference of the base. Moreover, the cover should be rotated only in a predetermined direction, i.e., either in a clockwise or a counterclockwise direction, to be separated from the base. If the cover is rotated in a reverse direction, it becomes impossible to separate the cover from the base.

Therefore, Japanese Utility Model Laid-Open Publication No. 4-84189 does not provide a disc package capable of allowing a cover to be fixed on a base simply by pressurizing the cover along a shaft axial direction with a locking mechanism for securely fixing the cover on the base.

Still another conventional disc package has a disc-shaped base for stacking thereon discs and a bucket-shaped cover for covering the discs mounted on the base, wherein protruded portions are disposed at the circumference of either the base or the cover, and coupling grooves to be coupled with the protruded portions are provided at the corresponding circumference. Such an example is disclosed in Japanese Patent Laid-Open Publication No. 2000-168872.

In such a disc package, when one end portion of the coupling groove extending along a circumferential direction of the cover faces to the protruded portion, a user can recognize that the cover can be separated from the base along the shaft axial direction. On the other hand, when the other end portion of the coupling groove faces to the protruded portion, a user can recognize that the cover cannot be separated from the base along the above-described direction.

Though not shown in FIGS. 7 and 8, when the cover is mounted on the base by being pressurized thereonto along the shaft axial direction, it is preferable to extend a circumferential length of the coupling groove as much as possible in order to precisely align the protruded portion with the groove. In other words, the best way to align is to form the coupling groove all around the circumference of the base or the bucket-shaped cover. In this case, the protruded portion can be more precisely aligned with the coupling groove in the process of mounting the cover on the base, but the protruded portion cannot be faced with the end portion of the coupling groove. Therefore, a user cannot recognize whether or not the cover can be separated from the base along the shaft axial direction. Further, in this case, the cover cannot be separated from the base in a conventional way.

Still another conventional disc package includes a disc-shaped base for stacking thereon discs and a shaft for aligning a plurality of stacked discs on the base, wherein the base and the shaft are manufactured as one body. In this case, a process for assembling the base and the shaft can be omitted. However, since they cannot be separated from each other even while being transported, transportation costs become increased.

In the meantime, there is a conventional disc package having a base and a shaft formed separately. In this case, it is required to assemble the base and the shaft. In such a disc package, the shaft is coupled to the base by using screws. An example is shown in Japanese Patent Laid-Open Publication No. 7-89585. Further, in another conventional disc package, a shaft is coupled to a base by performing, e.g., an ultrasonic welding. Such a disc package is disclosed in Japanese Patent Laid-Open Publication No. 11-349084. However, in case the shaft is installed on the base by using the two methods described above, assembly equipments are required and further, more time should be spent in assembly. As a result, an assembly cost becomes increased.

In order to prevent the assembly cost from being increased, there is provided a disc package in which a shaft is installed on a base by a snap fit. Specifically, a shaft is installed on the base with so-called an elastic pin using an elastic deformation of a portion of the shaft and made of resin. Such a disc package includes a flange contacting with a top surface of the base in order to make the shaft disposed vertically against the top surface of the base, and a coupling surface coupling to a bottom surface in order to prevent the shaft from being separated from the base. In this case, a distance between the flange and the coupling surface is larger than a thickness of the base located therebetween, so that the shaft can be installed on the base regardless of errors generated in manufacturing the base and the shaft. That is to say, there is provided a clearance between the distance and the thickness along the shaft axial direction. Further, for the same reason, a hole for mounting the shaft thereon, which is formed at the base, is larger than an external diameter of the shaft. In other words, there is also provided a clearance between the hole and the outer diameter along a shaft radial direction. As a result, since the shaft is shaken on the base, it is hard for the shaft to be vertically maintained against the top surface of the base. If the shaft is shaken and tilted, a merchantability of the disc package is decreased.

Still another conventional disc package includes a disc-shaped base for stacking discs thereon, a shaft for aligning a plurality of discs mounted on the base, a cover for covering the stacked discs and a concave portion formed at the cover in order to fit with an end portion of the shaft when the cover is mounted on the base. Such an example is disclosed in Japanese Patent Laid-Open Publication No. 2000-168872. In this disc package, grooves extending along a shaft axial direction are formed around a circumferential surface of the cover and protrusions are formed around a circumferential surface of the base. Further, when the cover is mounted on the base, a user needs to align the grooves with the protrusions to thereby fit the end portion of the shaft into the concave portion of the cover.

However, it is troublesome for a user to align the grooves with the protrusions. Therefore, it is preferable to mount the cover on the base by simply pressurizing the cover without the inconvenient aligning process.

In this case, however, if the cover is pressurized at a slight inclination angle onto the base, the end portion of the shaft and the concave portion of the cover may be misaligned. Especially, if the cover is made of a hard material, the end portion of the shaft will face with a peripheral portion of the concave portion. As a result, a user cannot pressurize the cover anymore, so that the end portion of the shaft and the concave portion cannot be coupled. Therefore, the cover cannot be mounted on the base.

SUMMARY OF THE INVENTION

It is, therefore, a primary object of the present invention to provide a disc package capable of accommodating therein a plurality of discs in a simplified manner.

It is another object of the present invention to provide a disc package having a locking mechanism for preventing a cover fixed on a base from being separated therefrom while the disc package is being transported; having a structure that allows the cover to be fixed on the base in one action; and, further, reducing the works needed to precisely align the cover along the circumference of the base.

It is still another object of the present invention to provide a disc package having a structure in which a cover can be fixed on a base by simply pressurizing the cover against the base in a base shaft axial direction and, at the same time, the cover can be prevented from being separated from the base while the disc package is being transported.

It is still another object of the present invention to provide a disc package in which a cover fixed on a base can be separated therefrom by rotating the cover along the circumference of the base in any direction, i.e., in either a clockwise or a counterclockwise direction.

It is still another object of the present invention to provide a disc package in which a user can recognize whether or not a cover can be separated from the base in a shaft axial direction of a base even in case a single coupling groove is mostly formed along the circumference of the base or the cover.

It is still another object of the present invention to provide a disc package capable of firmly securing a shaft on a base, thereby preventing the shaft from being unstable.

It is still another object of the present invention to provide a disc package in which an end portion of a shaft can be fitted into a concave portion of a cover even in case the end portion of the shaft is not well aligned with the concave portion of the cover.

In accordance with a preferred embodiment of the present invention, there is provided a disc package including: a base on which one or more discs are stacked; and a bucket-shaped cover for covering said one or more discs stacked on the base.

Preferably, a plurality of coupling groove portions are formed on the base while a plurality of protruded portions are formed on the bucket-shaped cover, each corresponding to one of the plurality of coupling groove portions, and the bucket-shaped cover can be fixed on the base by elastically deforming the protruded portions and, thereby, allowing each of the protruded portions to be engaged with corresponding one of the coupling groove portions.

More preferably, formed at the base next to each of the coupling groove portions is a pull-out groove portion, through which a protruded portion is taken out of corresponding one of the coupling groove portions once engaged therewith.

In the disc package, after the discs have been completely stacked on the base while performing a disc packaging, it is possible to mount the bucket-shaped cover on the base by fixing rectangular protruded portions into rectangular pull-out grooves while rendering each elastic piece to be elastically deformed toward the inside of the base, when the discs are covered by the cover. In other words, since screwing operation is not required in order to fix the cover on the base, the disc packaging can be much simplified.

Further, preferably, a plurality of elastic pieces, each having a protruded portion, is formed on the base and an annular coupling groove portion is formed at the bucket-shaped cover to be engaged with the protruded portions of the plurality of elastic pieces, and the bucket-shaped cover can be fixed on the base by elastically deforming the elastic pieces to thereby allow the protruded portions of the elastic pieces to be fitted into the annular coupling groove portion.

More preferably, a plurality of pull-out grooves is prepared at the bucket-shaped cover, each corresponding to one of the elastic pieces and connected to the annular coupling groove portion, to be used to take out the protruded portions from the annular coupling groove once engaged therewith.

In the disc package, after the discs are stacked on the base while performing a disc packaging, it is possible to mount the bucket-shaped cover on the base by fixing the protruded portions of the elastic pieces into the annular groove portion of the cover while rendering each elastic piece disposed at the base to be elastically deformed, when the discs are covered by the cover. In other words, since screwing operation is not required in order to fix the cover on the base, a disc packaging can be very much simplified.

Further, preferably, an annular coupling groove portion is formed at the base and a plurality of elastic pieces formed at the cover, each having a protruded portion to be fitted into the annular coupling groove portion, and the cover can be fixed on the base by elastically deforming the elastic pieces and, thus, allowing the protruded portions of the elastic pieces to be fitted into the annular coupling groove portion.

More preferably, a plurality of pull-out grooves is prepared at the base, respectively corresponding to one of the elastic pieces and connected to the annular coupling groove portion, to be used to take out the protruded portions from the annular coupling groove once engaged therewith.

In the disc package, after the discs are stacked on the base when performing a disc packaging, it is possible to mount the bucket-shaped cover on the base by fixing the protruded portions of the elastic pieces into the annular groove portion of the base while rendering each elastic piece disposed at the cover to be elastically deformed, when the discs are covered by the cover. In other words, since screwing operation is not required in order to fix the cover on the base, a disc packaging can be much simplified.

Further, preferably, a first coupling section is formed at one of the base and the cover while a second coupling section is prepared at the other one of the base and the cover, and the first and the second coupling section are connected to each other by a snap-fit locking mechanism where the second coupling section is elastically deformed. The circumferential length of the first coupling section is larger than that of the second coupling section.

In this disc package, since a first coupling section is formed at one of the base and the cover while a second coupling section is prepared at the other one of the base and the cover, it can be prevented the cover fixed on the base from being removed from the base due to vibrations generated while the disc package is being transferred. Further, since the first and the second coupling section are configured to be firmly engaged by a snap fit type coupling mechanism where some portions of the base and cover are elastically deformed, the cover can be fixed on the base in a single action. Further, since the circumferential length of the first coupling section is longer than that of the second coupling section, the disc package in accordance with the present invention can reduce the works needed to align the cover against the base in a circumferential direction in comparison with a conventional disc package disclosed in Japanese Utility Model Application No. 2-125170 (Japanese Utility Model Laid-Open Publication No. 4-84189).

Further, preferably, the cover once fixed on the base is not separated therefrom unless rotated along the circumference of the base, whereas the cover is fastened to the base by just pressurizing the cover against the base in a direction nominal to the base without rotating the cover along the circumference of the base.

Specifically, for example, a plurality of coupling groove portions are formed on the base while a plurality of protruded portions are formed on the bucket-shaped cover, each corresponding to one of the plurality of coupling groove portions. Once the protruded portions are coupled to the coupling grooves, the cover fixed on the base cannot be separated from the base unless it is rotated along the circumference of the base. The bucket-shaped cover can be fixed on the base by pressurizing the cover in a shaft axial direction against the base and elastically deforming the protruded portions without rotating along the circumference of the base and, thereby, allowing each of the protruded portions to be engaged with corresponding one of the coupling groove portions.

Further, a plurality of elastic pieces, each having a protruded portion, are formed on the base and an annular coupling groove portion is formed at the bucket-shaped cover to be engaged with the protruded portions of the plurality of elastic pieces. When the protruded portions are coupled to the coupling grooves, the cover fixed on the base cannot be separated from the base unless it is rotated along the circumference of the base. The bucket-shaped cover can be fixed on the base by pressurizing the cover in a shaft axial direction against the base and elastically deforming the elastic pieces to thereby allow each of the protruded portions of the elastic pieces to be fitted into the annular coupling groove portion.

Further, an annular coupling groove portion is formed at the base and a plurality of elastic pieces at the cover, each having a protruded portion to be fitted into the annular coupling groove portion. When the protruded portions are being coupled to the annular coupling groove, the cover fixed on the base cannot be separated from the base unless it is rotated along the circumference of the base. The bucket-shaped cover can be fixed on the base by pressurizing the cover in a shaft axial direction against the base and elastically deforming the elastic pieces and, thus, allowing the protruded portions of the elastic pieces to be fitted into the annular coupling groove portion.

That is to say, in accordance with the disc package, a cover can be fixed on a base simply by pressurizing the cover against the base along in a base shaft axial direction and, at the same time, the cover can be prevented from being accidentally separated from the base due to vibrations generated while the disc package is being transported.

More preferably, the material of the cover is more flexible than that of the base.

Therefore, in comparison with a hard cover, an elastic deformation of the cover becomes easy in the disc package and a resistance becomes reduced when the cover is fixed on the base.

Further, more preferably, a tapered portion is installed on the base to gradually elastically deform the cover to be fixed on the base.

Therefore, a rapid increase in the mounting resistance of the cover can be avoided when the cover is elastically deformed.

Further, more preferably, the cover once fixed on the base can be separated therefrom by rotating the cover along the circumference of the base in any direction, i.e., in either a clockwise or a counterclockwise direction.

More preferably, the base is provided with a coupling region having coupling groove portions to be coupled with protruded portions formed in the cover and a non-coupling region without coupling groove portions, the non-coupling region being disposed at both sides of the coupling region.

Therefore, in case the cover is rotated counterclockwise about the shaft, the protrusion coupled with the coupling groove is moved to the non-coupling region on that side to thereby be uncoupled. Therefore, the cover can be separated from the base. Similarly, in case of a clockwise rotation, the protrusion coupled with the coupling groove is moved to the non-coupling region on that side to thereby be uncoupled. As a result, the cover can be separated from the base. Likewise, in the disc package, the cover can be separated from the base with a rotation in any direction, i.e., clockwise or counterclockwise.

Further, preferably, the base is provided with a coupling region having coupling groove portions to be coupled with protruded portions formed at the cover and a non-coupling region without the coupling groove portions, wherein a boundary region for a user to recognize that the protruded portions are being moved from the coupling region to the non coupling region while the cover is being rotated about the shaft is interposed between the coupling region and the non-coupling region.

More preferably, a rotation resistance modification means, which modifies the rotation resistance of the cover to the base the moment the protruded portion is passing through the boundary region, is installed at the boundary region, so that a user can recognize that the protruded portion is being moved from the coupling region to the non-coupling region.

More preferably, the boundary region is provided with protrusions to be engaged with the protruded portions the moment that the protruded portion is passing through the boundary region.

Therefore, in the disc package, the user can determine whether or not the cover can be separated from the base by pressurizing the cover in the shaft axial direction even in case the coupling groove is formed all along the circumference of the base and, thus, it is impossible to render the protruded portion to collide with an end portion of the coupling groove which is extended in the circumferential direction as in the disc package disclosed in the Japanese Patent Laid-Open Publication No. 2000-168872.

In accordance with another preferred embodiment of the present invention, there is provided a disc package including: a disc-shaped base and a shaft for aligning a plurality of discs mounted on the base, wherein the shaft is installed on the base by a snap-fit locking mechanism.

Preferably, the shaft has a flange making contact with a top surface of the base for vertically installing the base on the top surface of the base and a coupling click coupled with a bottom surface of the base for preventing the shaft installed on the base being separated therefrom, wherein the coupling click is in a wedge shape to pressurize the flange onto the top surface of the base.

More preferably, when the shaft is installed on the base, the wedge-shaped coupling click is pressurized to the bottom surface of the base by a restoring force of the elastically deformed coupling click.

More preferably, the wedge-shaped coupling click has a tapered-shaped coupling surface and a distance between a bottom portion of the coupling surface and the flange is smaller than a thickness of the base supported between the flange and the coupling click.

Therefore, the flange is pressurized to the top surface of the base in the disc package. As a result, the shaft can be protected from being unstable on the basis of the base by erecting the shaft.

In accordance with still another preferred embodiment of the present invention, there is provided a disc-shaped base on which a plurality of discs are stacked and a bucket-shaped cover for covering the discs is mounted on the base.

Preferably, the disc package further includes a shaft for aligning a plurality of discs mounted on the base and a concave portion formed at the cover for the shaft to be fitted into and coupled with when the cover is mounted on the base, wherein the cover is deformed by the contact between a top end of the shaft and the concave portion in case the position of the top end of the shaft and that of the concave portion are not well aligned with each other to thereby move the top end of the shaft to the position of the concave portion.

Therefore, even in case the top end portion of the shaft faces to the convex portion located in a peripheral part of the concave portion due to the dislocation therebetween, the top end portion of the shaft can be fitted into the concave portion to be coupled to each other.

More preferably, when a convex portion is disposed at the periphery of the concave portion and the cover is deformed due to the contact between the convex portion and the top end portion of the shaft, the convex portion becomes tapered to allow the top end portion of the shaft to move toward the concave portion of the cover.

Since the convex portion is formed around the concave portion in this disc package, it becomes possible to move the end portion of the shaft up to a position where the concave portion starts more effectively than in the case where no convex portion, or the like, is prepared around the concave portion.

More preferably, the material of the cover is more flexible than that of the base and the shaft.

Therefore, in the disc package, the top end portion of the shaft can be moved to the position of the concave portion by effectively deforming the cover, in comparison with a case where the cover is not made of a flexible material.

BRIEF DESCRIPTION OF THE DRAWINGS

The above and other objects and features of the present invention will become apparent from the following description of preferred embodiments given in conjunction with the accompanying drawings, in which:

FIGS. 22A and 22B show an enlarged view of a protruded portion and that of a coupling groove portion shown in FIG. 19, respectively;

FIG. 23 describes a way how the protruded portion is fitted into and removed from the coupling groove portion in the disc package shown in FIG. 19;

FIGS. 39A and 39B respectively show a coupling protruded portion and a coupling groove portion shown in FIG. 36;

FIG. 40 explains a way how the coupling protruded portion is fitted into and removed from the coupling groove portion;

DETAILED DESCRIPTION OF THE PREFERRED EMBODIMENTS

Figure 1:
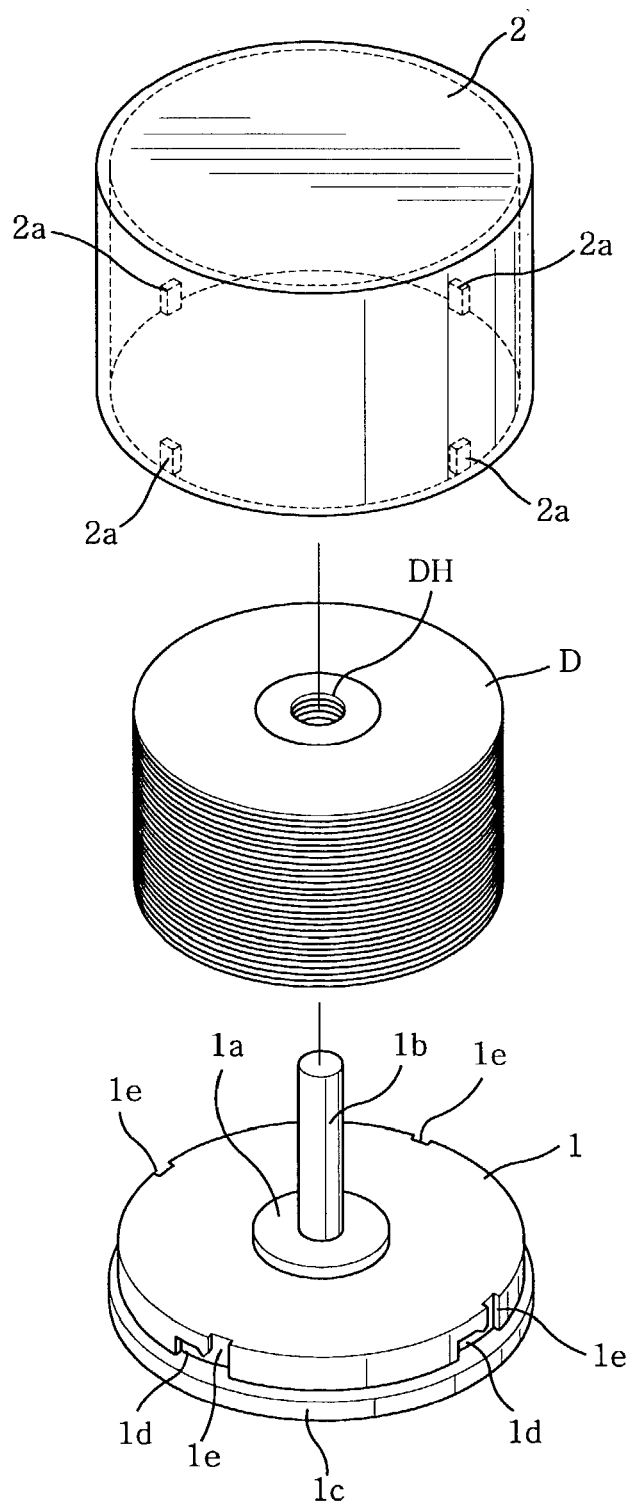
FIG. 1 shows an exploded perspective view of a disc package in accordance with a first embodiment of the present invention.
Figure 2:
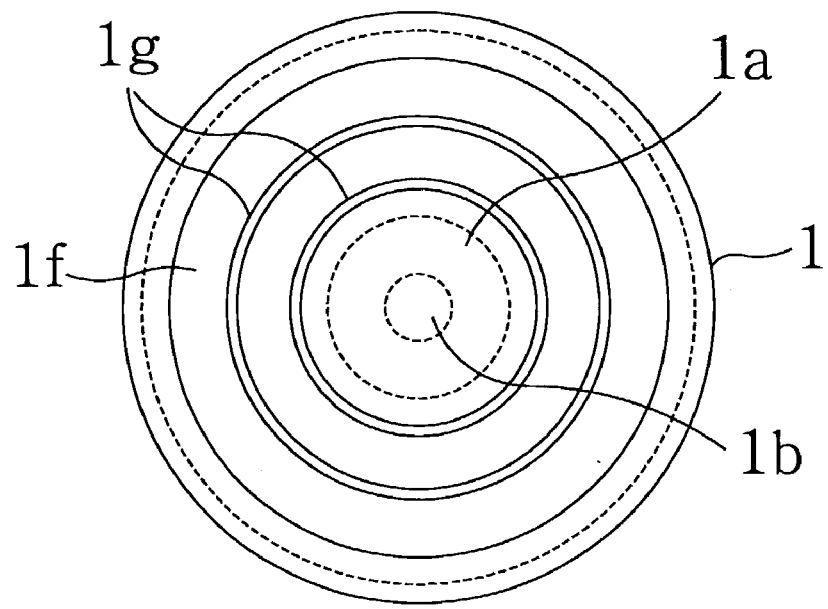
FIG. 2 offers a bottom view of a base shown in FIG. 1.
Figures 3A, 3B:
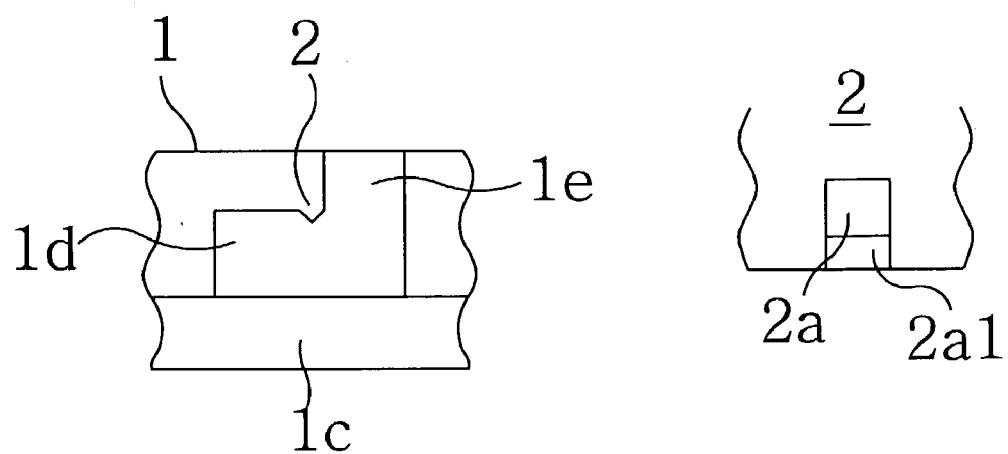
FIGS. 3A and 3B set forth enlarged views of a coupling and a pull-out groove portion and a protruded portion shown in FIG. 1, respectively.
Figure 4A:
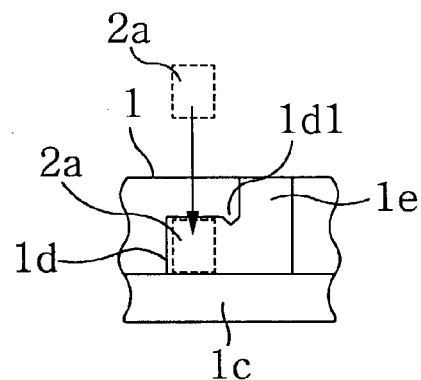
FIGS. 4A and 4B describe the way how the protruded portion of the bucket-shaped cover is fitted into and removed from the coupling groove portion of the base in the disc package shown in FIG. 1.
Figure 4B:
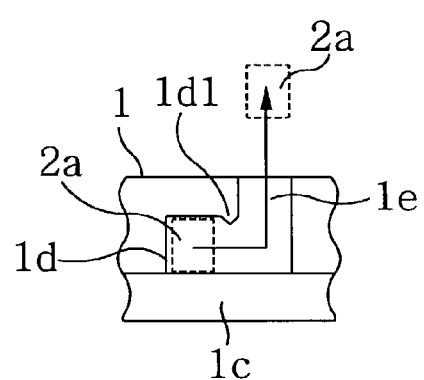

FIG. 1 shows a disc package in accordance with a first preferred embodiment of the present invention; FIG. 2, a bottom view of a base 1 shown in FIG. 1; FIG. 3A, an enlarged view of a coupling and a pull-out groove portion 1d and 1e formed at the base 1 shown in FIG. 1; FIG. 3B, an enlarged view of a protruded portion 2a of a bucket-shaped cover 2 shown in FIG. 1; FIGS. 4A and 4B, the way how the protruded portion 2a of the bucket-shaped cover 2 is fitted into and removed from the coupling groove portion 1d of the base 1 in the disc package shown in FIG. 1; and FIGS. 5A to 5C, a snap-fit locking mechanism of the disc package shown in FIG. 1.

As shown in FIG. 1, the disc package includes a disc-shaped base 1 and a bucket-shaped cover 2. The base 1 has a circular protruded portion 1a formed at the center of a top surface thereof. Installed at the center of the circular portion 1a is a cylindrical shaft 1b, which is to be inserted through a center hole (DH) of a disc (D). A circular stepped portion 1c is formed at a bottom surface of the base 1 to be brought into contact with a lower end portion of the cover 2. The outer diameter of the top surface of the base 1 is larger than that of the disc (D) and the diameter of the shaft 1b is a little bit smaller than that of the center hole (DH) of the disc. The outer diameter of the circular stepped portion 1c is substantially identical to that of the cover 2. Further, four coupling grooves 1d of a horizontally elongated rectangular shape are formed at a lower portion of a side surface of the base 1 at an interval of 90°. Connectedly formed to a right end portion of each of the coupling groove 1d is a pull-out groove 1e having a vertically elongated rectangular shape. A stopper 1d1 is formed at an entrance of each coupling groove 1d to prevent corresponding one of the four rectangular protruded portions 2a engaged therewith from being accidentally taken out through corresponding one of the four pull-out grooves 1e. Further, at a bottom surface of the base 1, there is provided a circular recess portion 1f, on which two reinforcement circular ribs 1g are concentrically formed as shown in FIG. 2.

Referring back to FIG. 1, the cover 2 is of a cylindrical shape having a closed upper end. Formed at an internal lower surface of the cover 2 are the four rectangular protruded portions 2a arranged at an interval of 90°. Each of the protruded portions 2a has a thickness a little bit smaller than the depth of each coupling groove 1d and has a tapered surface 2a1 at a lower portion thereof. The inner diameter of the cover 2 is slightly smaller than the outer diameter of the top surface of the base 1 while the outer diameter of the cover 2 substantially coincides with that of the circular stepped portion 1c.

When a plurality of discs (D) are packaged by using the base 1 and the cover 2, the shaft 1b is inserted through a center hole (DH) of each disc (D), so that the discs (D) are stacked on the base 1. Since the circular protruded portion 1a is formed on the top surface of the base 1 to be in contact with a clamping area (or a stack ring) of a disc mounted thereon, as described above, a surface of a lowermost disc, among the plurality of discs stacked on the base 1, is prevented from being damaged due to a friction generated between the top surface of the base 1 and the lowermost disc itself.

Figure 5A:
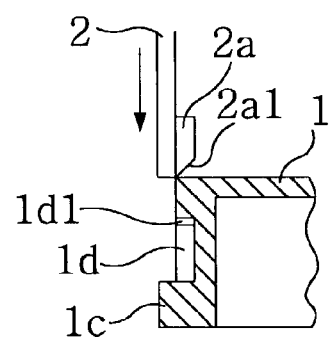
FIGS. 5A to 5C explain a snap-fit locking mechanism of the disc package shown in FIG. 1.
Figure 5B:
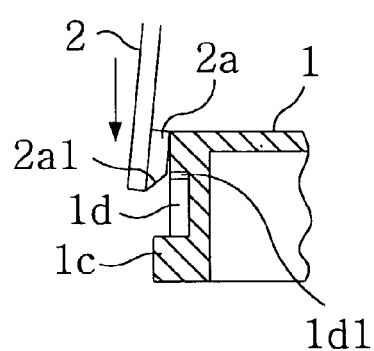
Figure 5C:
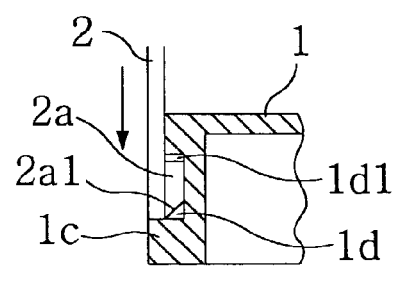

After a desired number of discs are completely stacked on the base 1, the cover 2 is placed on the base 1. At this time, it is not required to fit the protruded portions 2a of the cover 2 into the pull-out grooves 1e. Rather, the cover 2 is fastened to the base 1 by just locating the protruded portions 2a to be in a straight line with the coupling grooves 1d and pressurizing the cover 2 in a shaft axial direction. As shown in FIGS. 5A to 5C, if the case 2 is pressurized, the tapered surface 2a1 of each protruded portion 2a is brought into contact with an outermost edge of the base 1, which renders each protruded portion 2a elastically deformed outwardly. Then, the outwardly deformed protruded portions 2a are restored and fitted into the coupling grooves 1d to be engaged therewith. Concurrently, a lower end of the cover 2 is brought into contact with the stepped portion 1c of the base 1.

As can be seen from the above description of the first preferred embodiment of the present invention, the cover 2 can be fixed on the base 1 without a screwing operation, which is different from conventional cases where the screwing operation is required in order to fix the cover 2 on the base 1. Accordingly, the discs can be packaged in a very simplified manner in accordance with the present invention, so that the costs for the disc packaging can be greatly reduced. Further, as described above, since the stoppers 1d1 are installed at the entrances of the coupling grooves 1d, it can be prevented that the protruded portions 2a are accidentally taken out of the coupling grooves 1d through the pull-out grooves 1e due to vibrations generated while the disc package is being transferred. In other words, the cover 2 can be securely maintained on the base 1 even in transit.

As shown in FIG. 4B, the cover 2 mounted on the base 1 can be separated therefrom by rotating the cover 2 along the circumference of the base 1. As a result, the protruded portions 2a are moved from the coupling grooves 1d to the pull-out grooves 1e. Subsequently, the cover 2 is removed from the base 1 and the protruded portions 2a are taken out of the coupling grooves 1d through the pull-out grooves 1e. The stoppers 1d1 serve to prevent the protruded portions 2a from being accidentally separated from the coupling grooves 1d during the transportation of the disc package. However, it is configured that the user can readily move the protruded portions 2a from the coupling grooves 1d to the pull-out grooves 1e. Further, the user can also easily remount the separated cover 2 on the base 1.

As illustrated in FIG. 4A, the cover 2 can be fixed on the base 1 by simply pressurizing the cover 2 against the base 1 in an axial direction of the shaft 1b. However, as can be seen from FIG. 4B, the cover 2 cannot be separated from the base 1 unless it is rotated along the circumference of the base 1.

Figure 6A:
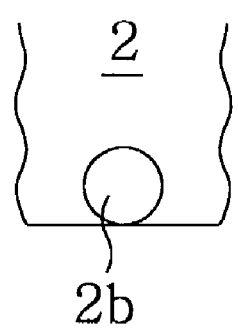
FIGS. 6A and 6B exemplify a modified snap-fit locking mechanism of the disc package shown in FIG. 1.
Figure 6B:
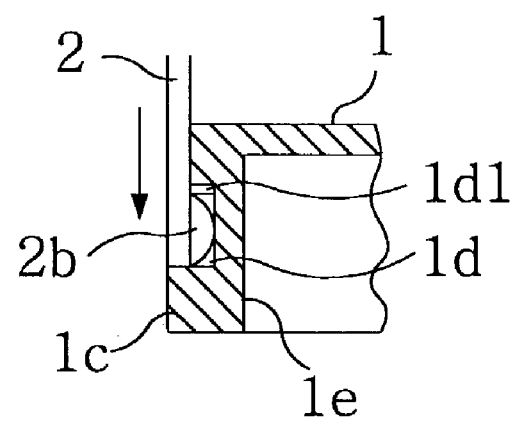

Though the protruded portions 2a are of the rectangular shape in the first preferred embodiment of the present invention, they can have a hemispheric shape as shown in FIGS. 6A and 6B, which have a similar effect to the rectangular protruded portions 2a. Further, though four protruded portions and four pull-out grooves are prepared in the first preferred embodiment, the base 1 and the cover 2 can be connected to or separated from each other by using the same simple mechanism as described in the first embodiment if the disc package has at least two protruded portions and two pull-out grooves.

Figure 7:
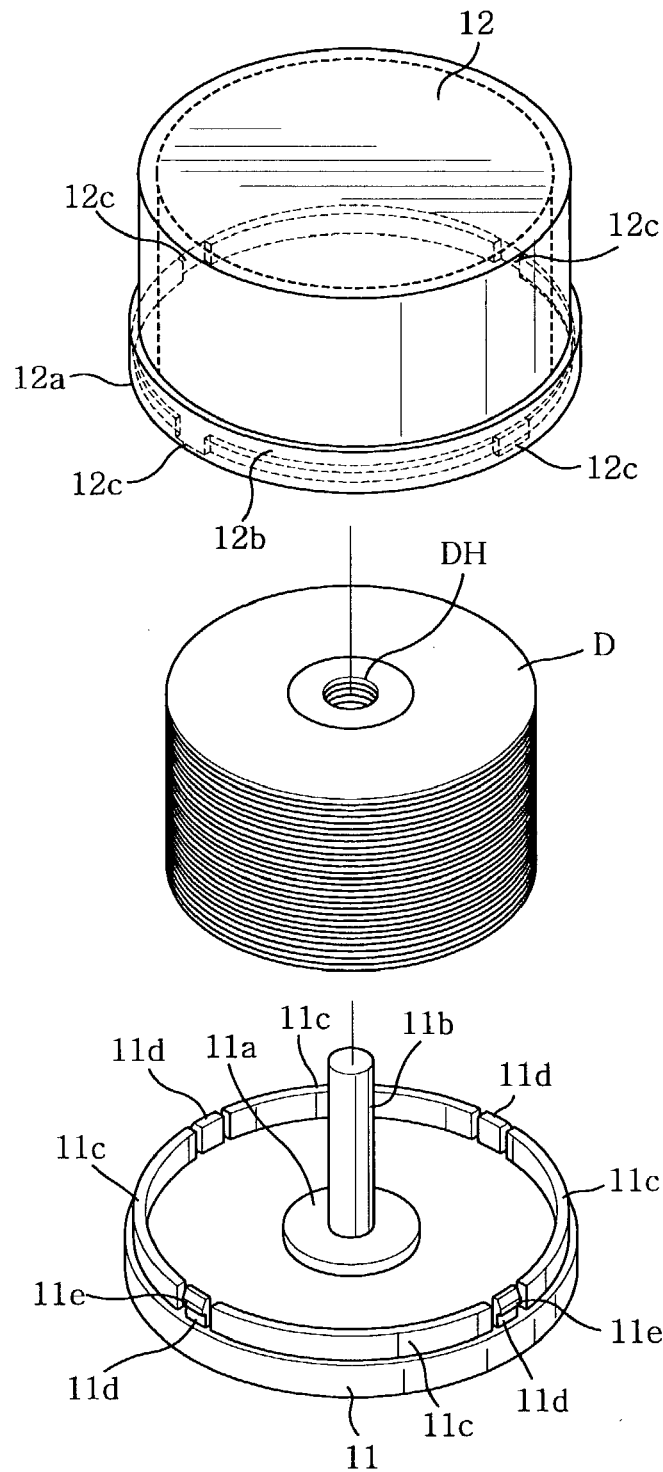
FIG. 7 offers a perspective view of a disc package in accordance with a second embodiment of the present invention.
Figure 8:
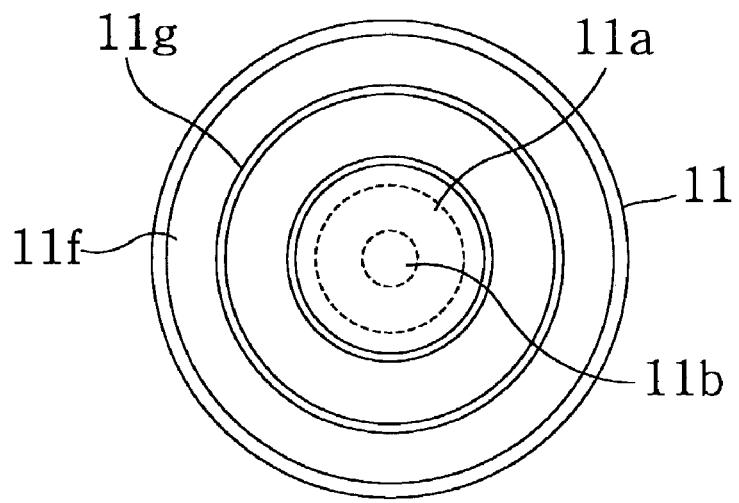
FIG. 8 demonstrates a bottom view of a base shown in FIG. 7.
Figure 9A:
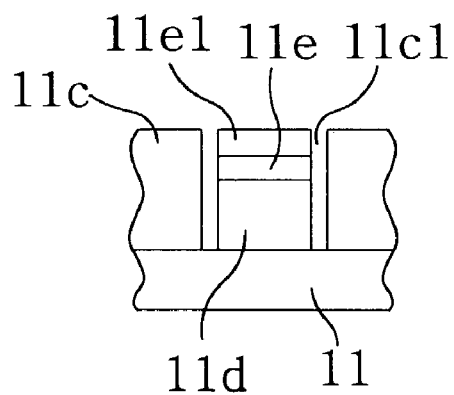
FIGS. 9A and 9B illustrate enlarged views of a protruded portion and a coupling and a pull-out groove portion shown in FIG. 7, respectively.
Figure 9B:
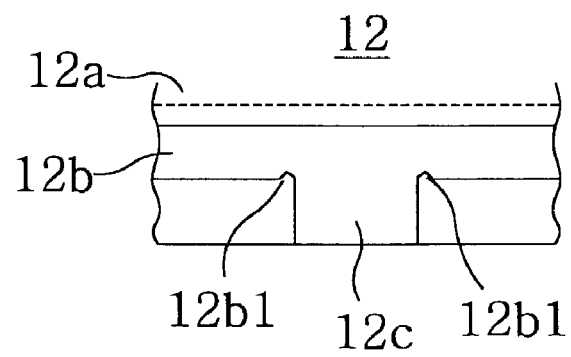
Figure 10A:
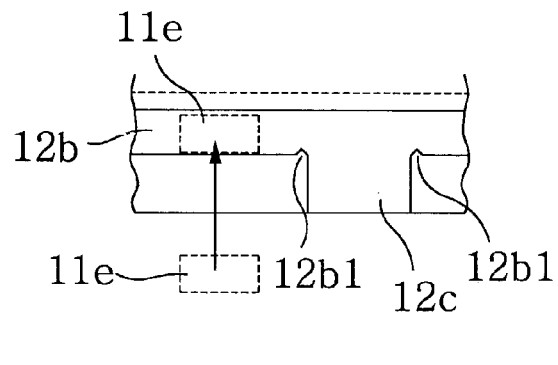
FIGS. 10A and 10B describe the way how the protruded portion of the base is fitted into and removed from the coupling groove portion of the bucket-shaped cover in the disc package shown in FIG. 7.
Figure 10B:
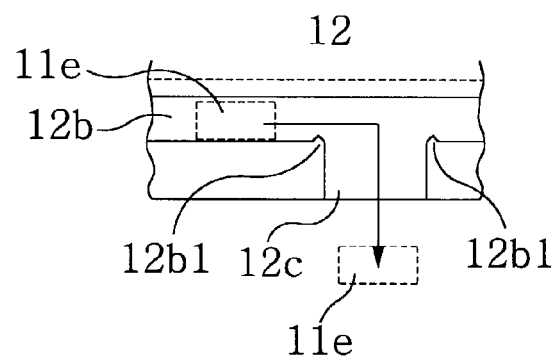

FIG. 7 depicts a perspective view of a disc package in accordance with a second embodiment of the present invention; FIG. 8, a bottom view of a base 11 shown in FIG. 7; FIG. 9A, an enlarged view of a protruded portion 11e of the base 11 shown in FIG. 7; FIG. 9B, an enlarged view of a coupling and a pull-out groove portion 12b and 12c of a bucket-shaped cover 12 shown in FIG. 7; FIGS. 10A and 10B, the way how the protruded portion 11e of the base 11 is fitted into and removed from the coupling groove portion 12b of the bucket-shaped cover 12 in the disc package shown in FIG. 7; and FIGS. 11A to 11C, a snap-fit locking mechanism of the disc package shown in FIG. 7.

As shown in FIG. 7, the disc package in accordance with the second embodiment of the present invention includes a base 11 and a cover 12. The base 11 has a disc shape. A circular protruded portion 11a is formed at the center of a top surface of the base 11. Installed at the center of the circular protruded portion 11a is a cylindrical shaft 11b, which is to be inserted through a center hole (DH) of a disc (D). The diameter of the shaft 1b is a little bit smaller than that of the disc center hole. Further, four arc-shaped walls 11c are installed at the periphery of the top surface of the base 11 at an interval of 90° with a space 11c1 intervened therebetween. The inner diameter of the base top surface region surrounded by the four walls 11c is a bit larger than the outer diameter of the disc (D) mounted thereon. As shown in FIGS. 9A and 9B, an elastic piece 11d is formed between spaces 11c1, having a thickness and a height substantially identical to those of the wall 11c. Formed at an outer upper portion of each elastic piece 11d is a rectangular protruded portion 11e, whose thickness is a little bit smaller than the depth of an annular groove portion 12b to be described later. Formed at an upper end portion of each rectangular protruded portion 11e is a tapered surface 11e1. Further, as shown in FIG. 8, formed at a bottom surface of the base 11 is a circular recess portion 11f, on which two reinforcement circular ribs 11g are concentrically formed.

Referring back to FIG. 7, the cover 12 is of a cylindrical shape having a closed upper end. A large-diameter portion 12a is formed at an outer lower portion of the cover 12. The inner diameter of an upper portion of the cover 12, the 'upper portion' herein used referring to a main body of the cover 12 except for the large-diameter portion 12a, is substantially identical to that of the base top surface region surrounded by the four walls 11c. The outer diameter of the four walls 11c is slightly smaller than the inner diameter of the large-diameter portion 12a. The outer diameter of the large-diameter portion 12a is substantially coincident with that of the base 11. Prepared along the inner circumference of the large-diameter portion 12a is an annular coupling groove 12b to be engaged with the rectangular protruded portions 11e. Four rectangular pull-out grooves 12c are formed right below the annular coupling groove 12b at an interval of 90°. Further, a stopper 12b1 is formed at the annular coupling groove 12b around every position where the annular coupling groove 12b and each of the four rectangular pull-out grooves 12c meet in order to prevent the rectangular protruded portions 11e from being accidentally taken out of the coupling groove 12b through the pull-out grooves 12c.

At a time when a plurality of discs (D) are packaged by using the base 11 and the cover 12, the shaft 11b of the base 11 is inserted through the center hole (DH) of each disc (D), so that the discs (D) are stacked on the base 11, more specifically, on the base top surface region surrounded by the four walls 11c. Since the circular protruded portion 11a is formed on the top surface of the base 11 to be brought into contact with a clamping area (or a stack ring) of a disc, a surface of a lowermost disc, among the plurality of discs stacked on the base 11, can be prevented from being damaged due to a friction generated between the top surface of the base 11 and the lowermost disc itself.

Figure 11A:
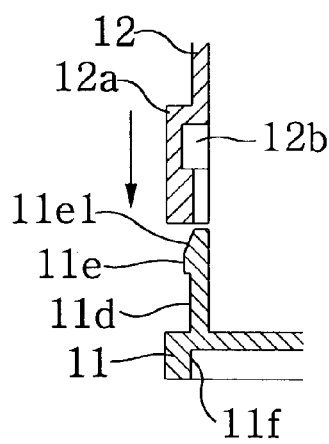
FIGS. 11A to 11C explain a snap-fit locking mechanism of the disc package shown in FIG. 7.
Figure 11B:
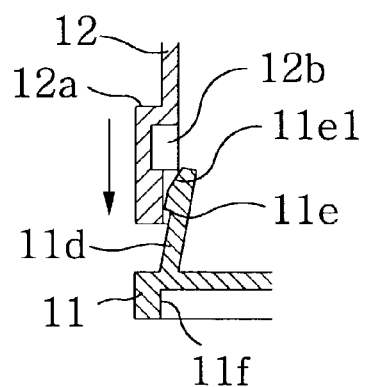
Figure 11C:
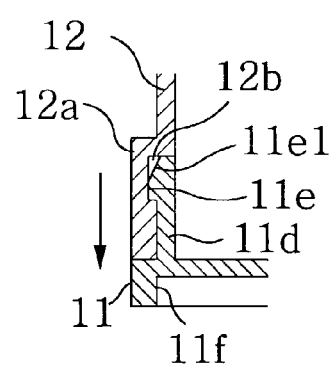

Having been completely stacked on the base 11, the discs (D) are covered by the bucket-shaped cover 12. At this time, it is not required to fit the rectangular protruded portions 11*e* of the elastic pieces 11*d* into the rectangular pull-out grooves 12*c* of the bucket-shaped cover 12. Rather, the cover 12 is placed on the base 11 in such a manner that no rectangular pull-out groove 12*c* is engaged with the rectangular protruded portions 11*e* of the elastic pieces 11*d*. As shown in FIGS. 11A to 11C, the tapered surface 11*a*1 of each rectangular protruded portion 11*e* is brought into contact with a lower end of the cover 12, which renders each elastic piece 11*d* to be elastically deformed toward the inside of the base 11. Subsequently, each of the deformed elastic pieces 11*d* is restored so that each rectangular protruded portion 11*d* is fitted into the annular coupling groove 12*b* to be engaged therewith. Simultaneously, the lower end of the cover 12 is brought into contact with the top surface circumference of the base 11.

As described above, the cover 12 can be fastened to the base 11 without a screwing operation in accordance with the second embodiment of the present invention, which is different from conventional cases where the screwing operation is required in order to fix the cover 12 on the base 11. Accordingly, the discs can be packaged in a very simplified manner, so that the costs for disc packaging can be greatly reduced. Further, since the stoppers 12*b*1 are installed at the annular coupling groove 12*b*, as described above, it can be prevented that the rectangular protruded portions 11*e* are accidentally taken out of the annular coupling groove 12*b* through the rectangular pull-out grooves 12*c* due to vibrations generated while the disc package is being transferred. In other words, the cover 12 can be securely maintained on the base 11 even in transit.

As shown in FIG. 10B, the cover 12 fixed on the base 11 can be separated therefrom by rotating the cover 12 along the circumference of the base 11. As a result, each rectangular protruded portion 11*e* is moved from the annular coupling groove 12*b* to a position right above one of the rectangular pull-out grooves 12*c*. Then, the cover 12 is removed from the base 11, and the rectangular protruded portions 11*e* are removed from the rectangular pull-out grooves 12*c*. The stoppers 12*b*1 serve to prevent the rectangular protruded portions 11*e* from being accidentally separated from the annular coupling groove 12*b* during the transportation of the disc package. However, it is configured so that the user can readily move the rectangular protruded portions 11*e* from the annular coupling groove 12*b* to the rectangular pull-out grooves 12*c*. Further, the user can also easily remount the separated cover 12 on the base 11.

As explained in the second preferred embodiment of the present invention provided in connection with FIG. 7, the annular coupling groove 12*b* is formed at the bucket-shaped cover 12 to serve as a first coupling section. The rectangular protruded portions 11*e* are formed at the base 11 to serve as second coupling section. Specifically, the first and the second coupling section, i.e., the coupling annular 12*b* and the rectangular protruded portions 11*e* are firmly engaged by a snap fit type coupling mechanism where some portions (elastic pieces 11*d*) of the base 11 are elastically deformed, thereby rendering the rectangular protruded portions 11*e* to be fitted into the annular coupling groove 12*b*. Further, the circumferential length of the annular coupling groove 12*b* serving as the first coupling section is longer than that of the rectangular protruded portions 11*e* serving as the second coupling section.

Further, as described in FIGS. 10A and 10B, the cover 12 can be mounted on the base 11 by simply pressurizing the cover 12 against the base 11 in an axial direction of the shaft 1*b*, without rotating the cover 12 along the circumference of the base 11. However, the cover 12 cannot be separated from the base 11 unless rotated along the circumference of the base 11.

Still further, in the disc package in accordance with the second embodiment of the present invention, the cover 12 fixed on the base 11 can be separated therefrom by rotating the cover 12 along the circumference of the base 11 in a clockwise or a counterclockwise direction, whichever is convenient.

Figure 12A:
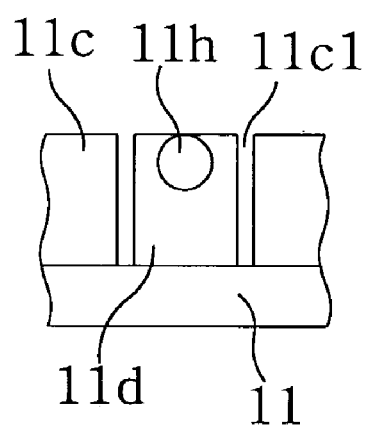
FIGS. 12A and 12B exemplify a modified snap-fit locking mechanism of the disc package shown in FIG. 7.
Figure 12B:
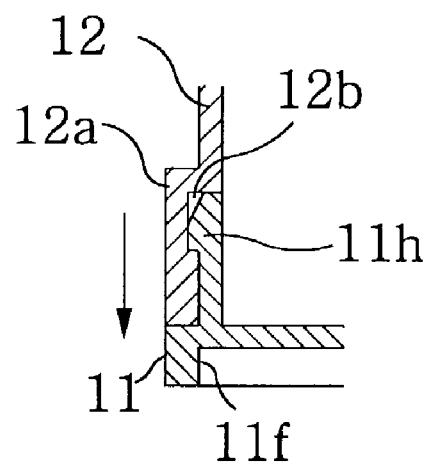

Though the protruded portions 11*e* are of a rectangular shape in the second preferred embodiment, they can have a hemispheric shape as shown in FIGS. 12A and 12B, which have a similar effect to the rectangular protruded portions 11*e*. Further, though four protruded portions and four pull-out grooves are prepared in the second preferred embodiment, the base 11 and the cover 12 can be connected to or separated from each other by using the same simple mechanism as described in the second embodiment if the disc package has at least two protrusions and two pull-out grooves. Further, though the annular coupling groove 12*b* is formed in the second embodiment to be engaged with the protruded portions 11*e*, it is also preferable to prepare protruded portions (not shown) capable of being coupled to the protruded portions 11*e* in lieu of the annular coupling groove 12*b*.

Figure 13:
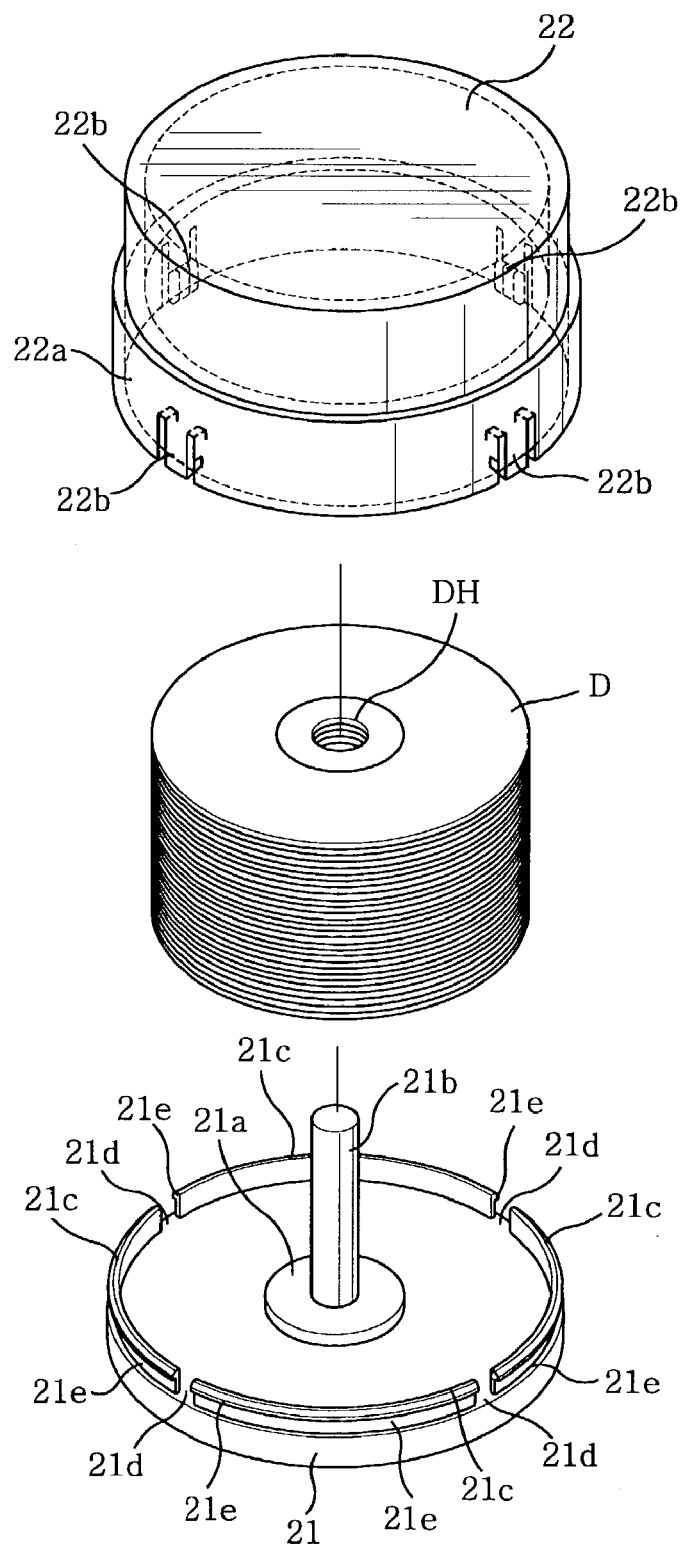
FIG. 13 is an exploded perspective view of a disc package in accordance with a third embodiment of the present invention.
Figure 14:
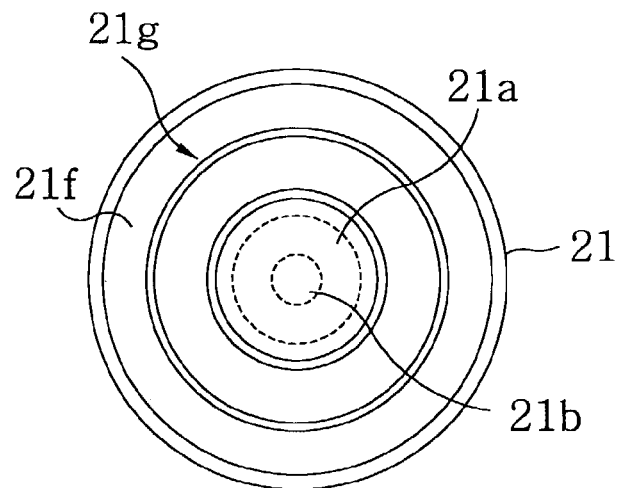
FIG. 14 provides a bottom view of a base shown in FIG. 13.
Figure 15A:
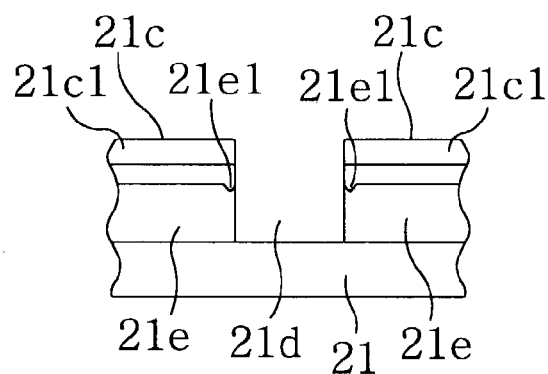
FIGS. 15A and 15B illustrate enlarged views of a coupling and a pull-out groove portion and a protruded portion shown in FIG. 13, respectively.
Figure 15B:
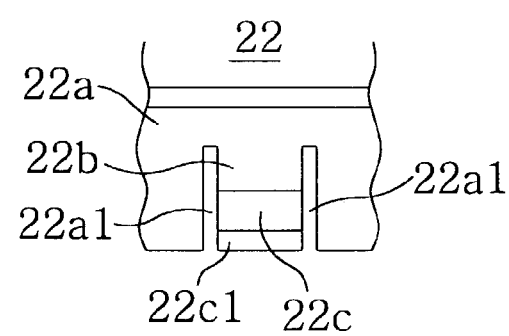
Figure 16A:
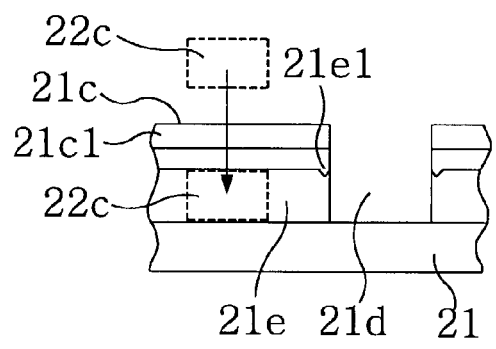
FIGS. 16A and 16B describe the way how the protruded portion of the bucket-shaped cover is fitted into and removed from the coupling groove portion of the base in the disc package shown in FIG. 13.
Figure 16B:
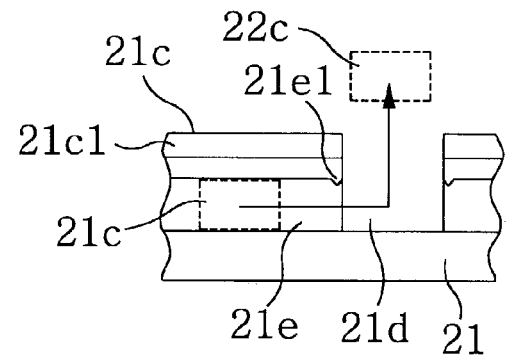

FIG. 13 shows a perspective view of a disc package in accordance with a third embodiment of the present invention; FIG. 14, a bottom view of a base 21 shown in FIG. 13; FIG. 15A, an enlarged view of a coupling and a pull-out groove portion 21*e* and 21*d* of the base 21 shown in FIG. 13; FIG. 15B, an enlarged view of a protruded portion 22*c* of a bucket-shaped cover 22 shown in FIG. 13; FIGS. 16A and 16B, the way how the protruded portion 22*c* of the bucket-shaped cover 22 is fitted into and removed from the coupling groove portion 21*e* of the base 21 in the disc package shown in FIG. 13; and FIGS. 17A to 17C, a snap-fit locking mechanism of the disc package shown in FIG. 13.

As shown in FIG. 13, the disc package in accordance with the third preferred embodiment of the present invention includes a base 21 and a cover 22. The base 21 has a disc shape. A circular protruded portion 21*a* is formed at the center of a top surface of the base 21. Installed at the center of the circular protruded portion 21*a* is a cylindrical shaft 21*b*, which is to be inserted through a center hole (DH) of a disc (D). The diameter of the shaft 21*b* is a little bit smaller than that of the disc center hole (DH). Further, four arc-shaped walls 21*c* are installed at the periphery of the top surface of the base 21 at an interval of 90° with a space intervened therebetween, the space serving as a pull-out groove 21*d*. A tapered surface 21*c*1 is formed at an outer upper end portion of each wall 21*c*. An inner diameter of the base top surface region surrounded by the four walls 21*c* is a bit larger than an outer diameter of the disc (D). Prepared at an outer lower portion of each wall 21*c* is an annular coupling groove 21*e*, which is formed to be coupled to a protruded portion 22*c* to be described later. Each annular coupling groove 21*e* is located next to corresponding one of the pull-out grooves 21*d*. A stopper 21*e*1 is formed at an entrance of each of the annular coupling grooves 21*e* in order to prevent corresponding one of the four protruded portions 22*c* engaged therewith from being accidentally taken out through corresponding one of the rectangular pull-out grooves 21*d*.

The cover 22 is of a cylindrical shape having a closed upper end. A large-diameter portion 22a is formed at an outer lower portion of the cover 22. The inner diameter of an upper portion of the cover 22, the 'upper portion' herein used referring to a main body of the cover 22 except for the large-diameter portion 22a, is substantially identical to that of the base top surface region surrounded by the four walls 21c. The outer diameter of the four walls 21c is slightly smaller than the inner diameter of the large-diameter portion 22a. The outer diameter of the large-diameter portion 22a substantially coincides with that of the base 21. Four elastic pieces 22b, each of which being inserted between a pair of parallel slits 22a1, are formed at a lower portion of the large-diameter portion 22ia at an interval of 90°. Formed at an inner lower portion of each of the elastic pieces 22b is a rectangular protruded portion 22c. Each of the protruded portions 22c has a thickness a little bit smaller than the depth of each annular coupling groove 21e. A tapered surface 22c1 is formed at a lower part of each protruded portion 22c. Further, prepared at a bottom surface of the base 21 is a circular recess portion 21f, on which two reinforcement circular ribs 21g are concentrically formed.

At a time when a plurality of discs (D) are packed by using the base 21 and the cover 22, the shaft 21b of the base 21 is inserted through the center hole (DH) of each disc (D), so that the discs (D) are stacked on the base 21, to be more specific, on the base top surface region surrounded by the four walls 21c. Since the circular protruded portion 21a is formed on the top surface of the base 21 to be brought into contact with a clamping area (or a stack ring) of a disc, it can be prevented that a surface of a bottommost disc (D), among the plurality of discs stacked on the base 21, is damaged due to a friction generated between the base top surface and the bottommost disc (D) itself.

Figure 17A:
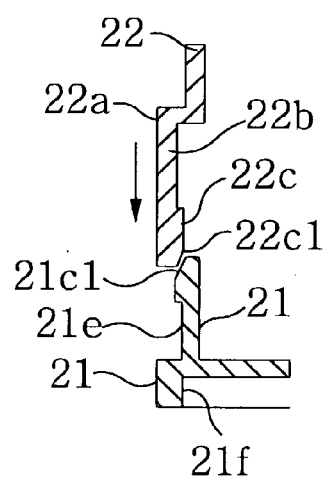
FIGS. 17A to 17C explain a snap-fit locking mechanism of the disc package shown in FIG. 13.
Figure 17B:
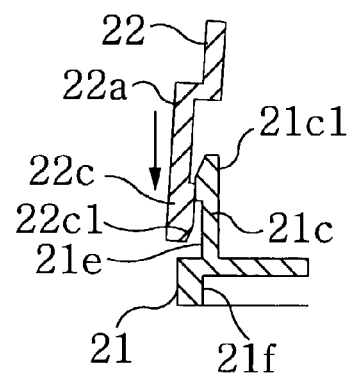
Figure 17C:
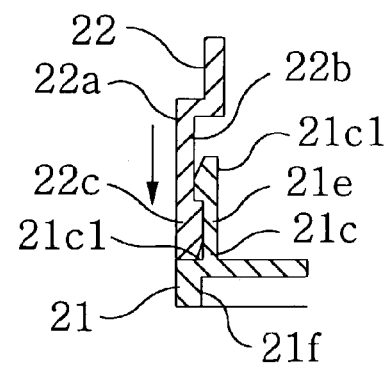

After a desired number of discs (D) are stacked on the base 21, the cover 22 is placed on the base 21. At this time, it is not required to fit the protruded portions 22c of the elastic pieces 22b into the pull-out grooves 21d of the base 21. Rather, the cover 22 is placed on the base 21 in such a manner that the protruded portions 22c are not in a straight line with the pull-out grooves 21d. As shown in FIGS. 17A to 17C, the tapered surface 22c1 of each protruded portion 22c is brought into contact with the tapered surface 21c1 of corresponding one of the walls 21c, which renders each elastic piece 22b to be elastically deformed outwardly. Subsequently, each of the deformed elastic pieces 22b is restored so that each protruded portion 22c is fitted into one of the annular coupling grooves 21e to be engaged therewith. Simultaneously, the lower end of the cover 22 is brought into contact with the top surface circumference of the base 21.

As described above, the cover 22 can be fixed on the base 21 without a screwing operation in accordance with the third embodiment of the present invention, which is different from conventional cases where the screwing operation is required in order to fix the cover 22 on the base 21. Accordingly, the discs can be packaged in a very simplified manner, so that the costs for disc packaging can be considerably reduced. Further, since the stoppers 21e1 are installed at the annular coupling grooves 21e, as described above, it can be prevented that the protruded portions 22c are accidentally taken out of the annular coupling grooves 21e through the pull-out grooves 21d because of vibrations generated while the disc package is being transferred.

As shown in FIG. 16B, the cover 22 fixed on the base 21 can be separated therefrom by rotating the cover 22 along the circumference of the base 21. As a result, the protruded portions 22c are moved from the annular coupling grooves 21e to the pull-out grooves 21d. Then, the cover 22 is removed from the base 21 and the protruded portions 22c are taken out of pull-out grooves 21d. The stoppers 21e1 serve to prevent the protruded portions 22c from being accidentally removed from the annular coupling grooves 21e during the transportation of the disc package. However, it is configured so that the user can readily move the protruded portions 22c from the annular coupling grooves 21e to the pull-out grooves 21d. Further, the user can also easily remount the separated cover 22 on the base 21.

As explained in the above-described third embodiment of the present invention shown in FIG. 13, the annular coupling grooves 21e are formed at the base 21 to serve as first coupling sections. The protruded portions 22c are formed at the cover 22 to serve as second coupling sections. Specifically, the first and the second coupling sections, i.e., the coupling annular groves 21e and the protruded portions 22c are firmly engaged by a snap fit type coupling mechanism where some portions (elastic pieces 22b) of the cover 22 are elastically deformed, thereby rendering the protruded portions 22c to be fitted into the annular coupling grooves 21e. Further, the circumferential length of the first coupling sections, i.e., the annular coupling grooves 21e is longer than that of the second coupling sections, i.e., the protruded portions 22c.

Further, as described in FIGS. 16A and 16B, the cover 22 can be mounted on the base 21 without rotating the cover 22 along the circumference of the base 21 but by simply pressurizing the cover 22 against the base 21 in an axial direction of the shaft 21b. However, the cover 22 cannot be separated from the base 21 unless it is rotated along the circumference of the base 21.

As illustrated in FIG. 13, the cover 22 fixed on the base 21 can be separated therefrom by rotating the cover 22 along the circumference of the base 21 in either a clockwise or a counterclockwise direction, whichever is convenient.

Figure 18A:
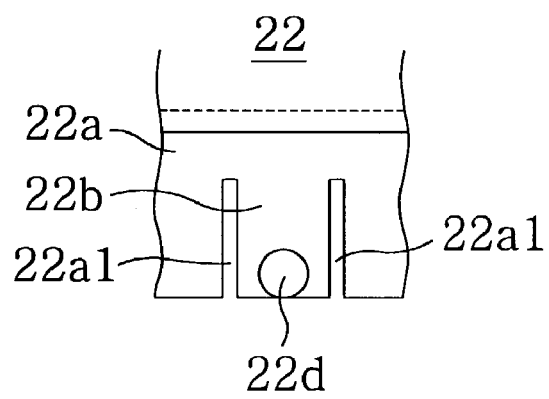
FIGS. 18A and 18B exemplify a modified snap-fit locking mechanism of the disc package shown in FIG. 13.
Figure 18B:
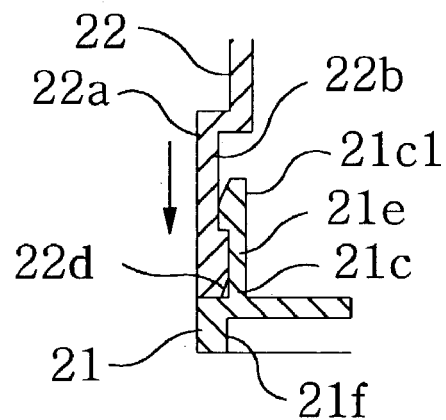

Though the protruded portions 22c are of a rectangular shape in the third preferred embodiment of the present invention, they can have a hemispheric shape as shown in FIGS. 18A and 18B, which have a similar effect to the rectangular protruded portion 22c. Further, though four protruded portions and four pull-out grooves are prepared in the third preferred embodiment, the base 21 and the cover 22 can be connected to or separated from each other by using the same simple mechanism as described in the third embodiment if the disc package has at least two protruded portions and two pull-out grooves. Further, though the annular coupling grooves 21e are formed to serve as coupling sections to be engaged with the protruded portions 22c, it is also preferable to prepare protruded portions (not shown) capable of being coupled to the protruded portions 22c in lieu of the annular coupling grooves 21e.

Figure 19:
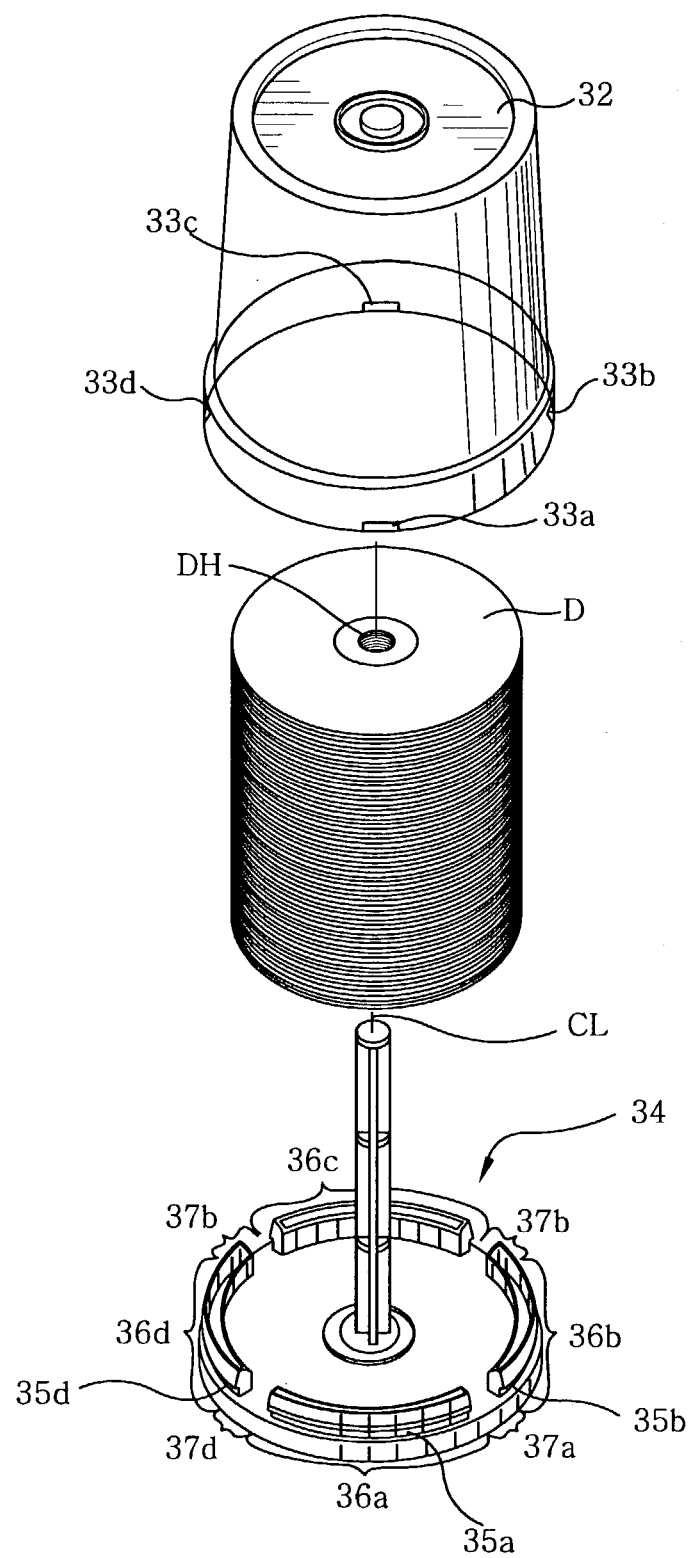
FIG. 19 is an exploded perspective view of a disc package in accordance with a fourth embodiment of the present invention.

Hereinafter, there is described a disc package in accordance with a fourth preferred embodiment of the present invention. FIG. 19 is an exploded perspective view of the disc package. Reference 32 denotes a bucket-shaped cover; 33a to 33d, protruded portions formed in the cover 32; D, discs; DH, a center hole of the disc D; CL, a central axial line; 34, a disc-shaped base; 35a to 35d, coupling grooves (35c: not shown) formed in the base 34 to be coupled with the protrusion portions 33a to 33d; 36a to 36d, coupling sections having the coupling grooves 35a to 35d; and 37a to 37d, non-coupling sections formed without the coupling grooves 35a to 35d. As shown in FIG. 19, non-coupling sections 37d and 37a are disposed at both sides of a coupling section 36a having a coupling groove 35a; non-coupling sections 37a and 37b, at both sides of a coupling section 36b having a coupling groove 35b; non-coupling sections 37b and 37c, at both sides of a coupling section 36c having a coupling groove 35c (not shown); and non-coupling sections 37c and 37d, at both sides of a coupling section 36d having a coupling groove 35d, respectively.

Figure 20:
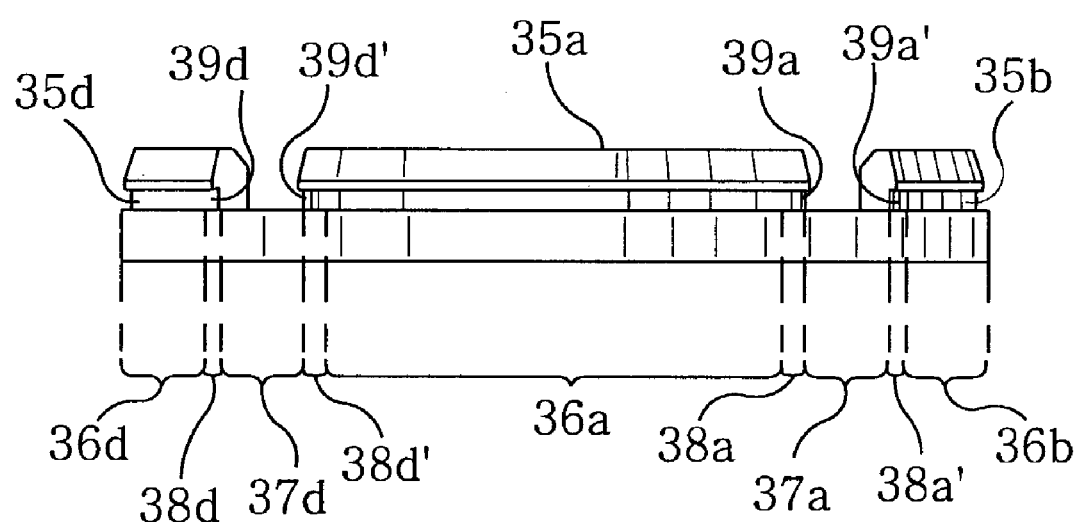
FIG. 20 provides a side view of a base shown in FIG. 19.

FIG. 20 depicts a side view of the base shown in FIG. 19. In FIG. 20, reference numeral 38a represents a boundary region 38a interposed between the coupling section 36a and the non-coupling section 37a; 38a', a boundary region between the coupling section 36b and the non-coupling section 37a; 38d, a boundary region between the coupling section 36d and the non-coupling section 37d; 38d', a boundary region between the coupling section 36a and the non-coupling section 37d; and 39a, 39a', 39d and 39d', protrusions formed at the boundary regions 38a, 38a', 38d and 38d', respectively.

Similarly, though not shown, a boundary region 38b is positioned between the coupling section 36b and the non-coupling section 37b; a boundary region 38b' between the coupling section 36c and the non-coupling section 37b; a boundary region 38c between the coupling section 36c and the non-coupling 37c; and a boundary 38c' between the coupling section 36d and the non-coupling section 37c. Further, protrusions 39b, 39b', 39c and 39c' are formed at the boundary region 38b, 38b', 38c and 38c', respectively.

Figure 21:
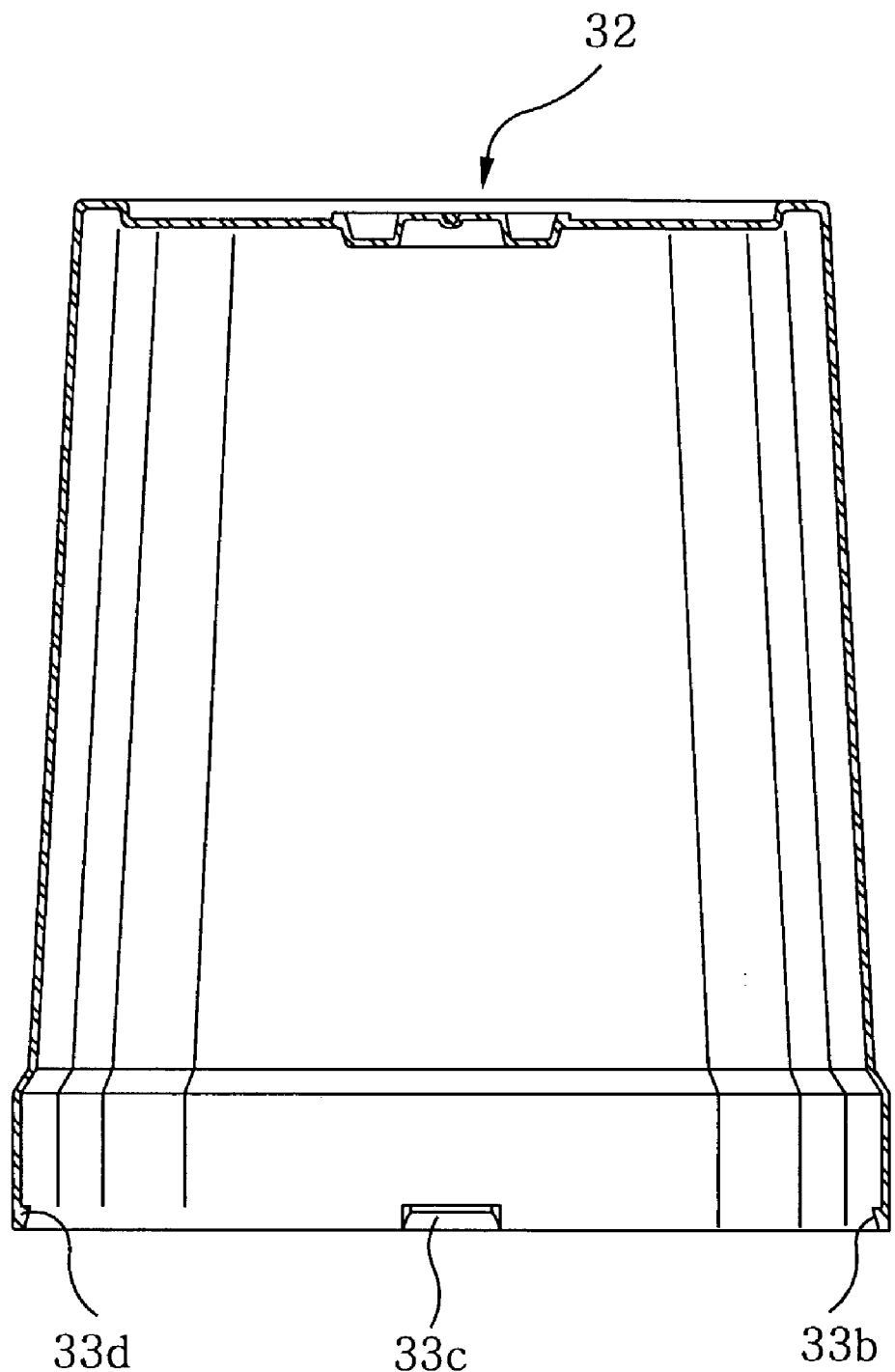
FIG. 21 offers a cross-sectional view of a bucket-shaped cover shown in FIG. 19.
Figure 24A:
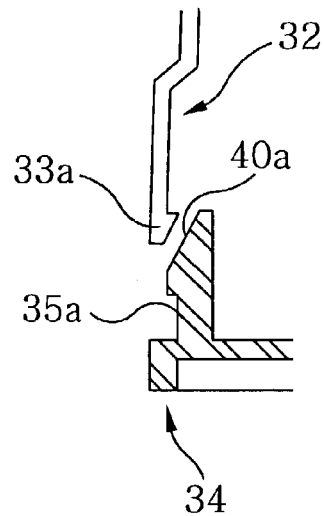
FIGS. 24A to 24C explain a snap-fit locking mechanism of the disc package shown in FIG. 19.
Figure 25:
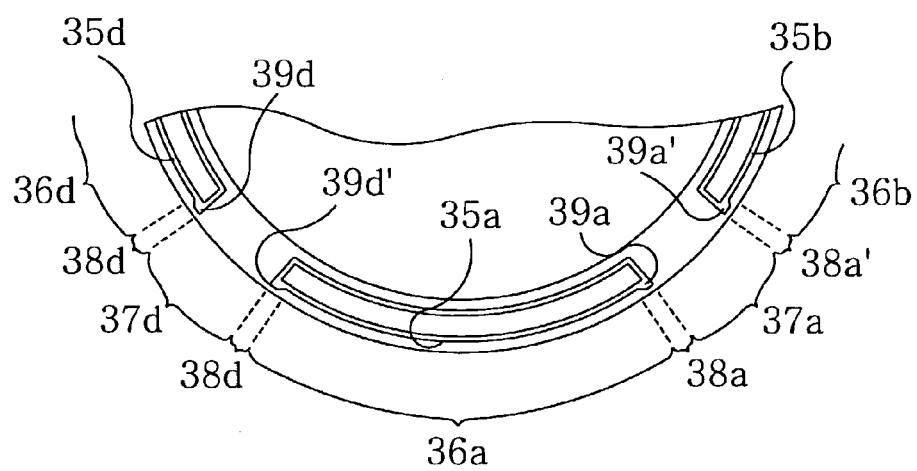
FIG. 25 describes a cross-sectional view of protrusions, coupling groove portions, coupling regions and non-coupling regions shown in FIG. 20.
Figure 26:
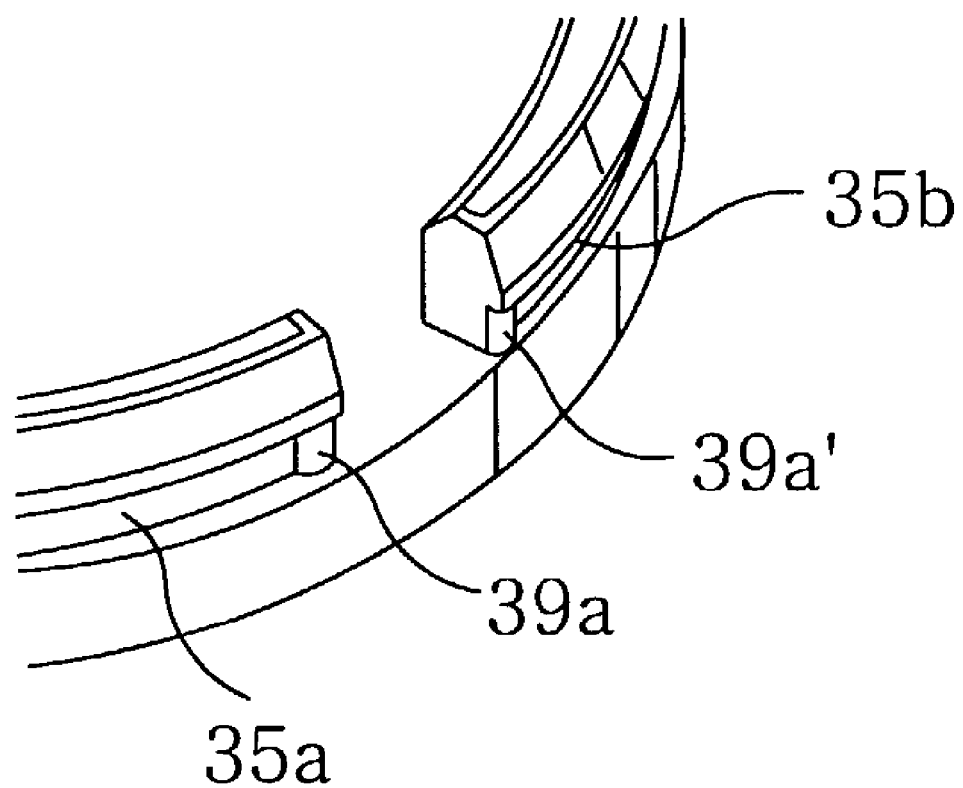
FIG. 26 sets forth a perspective view of the protrusions and the coupling regions shown in FIG. 20.

FIG. 21 describes a cross-sectional view of the bucket-shaped cover shown in FIG. 19; FIGS. 22 to 24, enlarged views of the protrusion 33a and the coupling groove 35a and the like shown in FIG. 19; FIG. 25, a sectional view of the protrusions 39a, 39a', 39d and 39d' and the like shown in FIG. 20; and FIG. 26, a perspective view of the protrusions 39a and 39a' and the coupling grooves 35 and 35b. In FIG. 24, a tapered surface 40a formed at the base 34 corresponds to the coupling groove 35a. Likewise, though not shown in drawing, tapered surfaces 40b, 40c, and 40d formed at the base 34 correspond to the coupling grooves 35b, 35c and 35d, respectively.

As shown in FIG. 19, in the disc package of the fourth preferred embodiment, coupling grooves 35a to 35d serving as first coupling sections to be coupled with the coupling protrusions 33a to 33d serving as second coupling sections by a snap fit due to an elastic deformation of the cover 32 are formed at the base 34 and the bucket-shaped cover 32, respectively. Each circumferential length of the coupling grooves 35a to 35d is longer than that of the coupling protrusions 33a to 33d. Further, though the coupling grooves 35a to 35d are formed in the fourth preferred embodiment to be engaged with the protrusions 33a to 33d, it is preferable to prepare protruded portions (not shown) capable of being coupled to the protrusions 33a to 33d instead of the coupling grooves 35a to 35d.

Figure 24B:
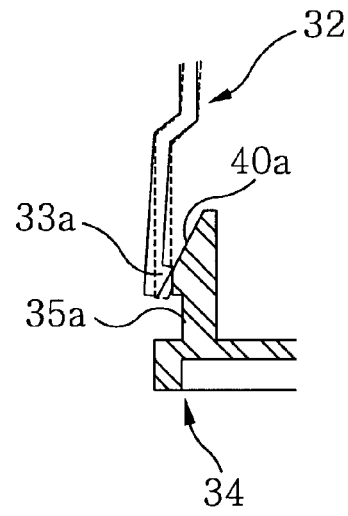
Figure 24C:
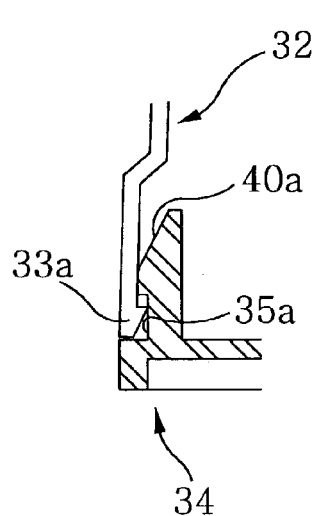

In the disc package shown in FIGS. 19, 23 and 24, the bucket-shaped cover 32 can be mounted on the base 34 by simply pressurizing along in a shaft axial direction CL, without rotating the cover 32 along the circumference of the base 34. In other words, when the cover 32 is mounted on the base 34, the cover 32 is pressurized onto the base 34 in the shaft axial direction. As shown in FIG. 23, the protrusion 33a is moved to a position of the protrusion 33a' without rotating the cover 32 along the circumference of the base 34. Further, as shown in FIG. 24b in detail, the cover 32 is elastically deformed to couple the protrusions 33a to 33d with the coupling grooves 35a to 35d.

In such a disc package, the cover 32 is made of a flexible material, e.g., PP (polypropylene), which is more deformable than the base 34 in order to reduce a mounting resistance of the cover 32. Further, there are provided the tapered surfaces 40a to 40d for elastically deforming the cover 32 so as to prevent the mounting resistance of the cover 32 from being rapidly increased.

Further, as shown in FIGS. 19, 23 and 24, the cover 32 cannot be separated from the base 34 unless it is rotated along the circumference of the base 34. That is to say, the cover 32 is rotated against the base 34 and then is separated from the base 34 in the shaft axial direction. As illustrated in FIG. 23, when the cover 32 is separated from the base 34, the protrusion 33a' is moved from the coupling groove 35a to the non-coupling section 37a (referring to FIG. 19) and then moved to a position of the protrusion 33a'' in the shaft axial direction.

As illustrated in FIG. 19, the cover 32 fixed on the base 34 can be separated therefrom by rotating the cover 32 along the circumference of the base 34 in either a clockwise or a counterclockwise direction, whichever is convenient. The coupling grooves 35a to 35d to be coupled with the protrusions 33a to 33d are disposed at both sides of the coupling sections 36a to 36d. Accordingly, in case the cover 32 is rotated counterclockwise against the base 34, the protrusion 33a coupled to the coupling groove 35a is moved to the non-coupling section 37a to thereby be uncoupled from each other. Therefore, the cover 32 can be separated from the base 34. On the other hand, in case of a clockwise rotation, the protrusion 33a coupled to the coupling groove 35a is moved to the non-coupling section 37d to thereby be uncoupled from each other. As a result, the cover can be separated from the base 34. Likewise, in the disc package of the fourth preferred embodiment, the cover 32 can be separated from the base 34 with a rotation in any direction, i.e., clockwise or counterclockwise. Therefore, a left-handed user as well as a right-handed user can separate the cover 32 from the base 34 with ease.

Further, as shown in FIGS. 19, 20 and 25, in the disc package, the boundary regions 39a, 39a', 39b, 39b', 39c, 39c', 39d and 39d' are interposed between the coupling sections 36a to 36d and the non-coupling sections 37a to 37d, wherein the boundary regions are used for a user to recognize that the protrusions 33a to 33d are moved to the coupling sections 36a to 36d from the non-coupling sections 37a to 37d while the cover 32 is being rotated. Specifically, the moment that the protrusions 33a to 33d are passing through the boundary regions, the means disposed at the boundary regions described above changes a rotation resistance between the cover and the base. That is to say, the protrusions 38a, 38a', 38b, 38b', 38c, 38c', 38d and 38d' formed at the boundary regions are in contact with the protrusions 33a to 33d the moment described above to thereby render the user a good snap fit.

Therefore, in case the cover 32 fixed on the base 34 is rotated in a left direction against the base 34, the protrusion 33a is in contact with the protrusion 39a the moment that the protrusion 33a coupled to the coupling groove 35a is moved from the coupling section 36a to the non-coupling section 37a (the protrusions 33b to 33d are in contact with the protrusions 39b to 39d). As a result, the rotation resistance of the cover 32 is slightly increased and therefore, a user can recognize that the protrusion 33a is being moved to the non-coupling section 37a. On the other hand, in case the cover 32 is rotated in a right direction against the base 34, the protrusion 33a is in contact with the protrusion 39d 'the moment that the protrusion 33a coupled with the coupling groove 35a is being moved from the coupling section 36a to the non-coupling section 37d (the protrusions 33b to 33d are in contact with the protrusions 39a' to 39c'). Accordingly, the rotation resistance of the cover 32 is slightly increased and, therefore, a user can recognize that the protrusion 33*a* is being moved to the non-coupling section 37*d*.

Figure 27:
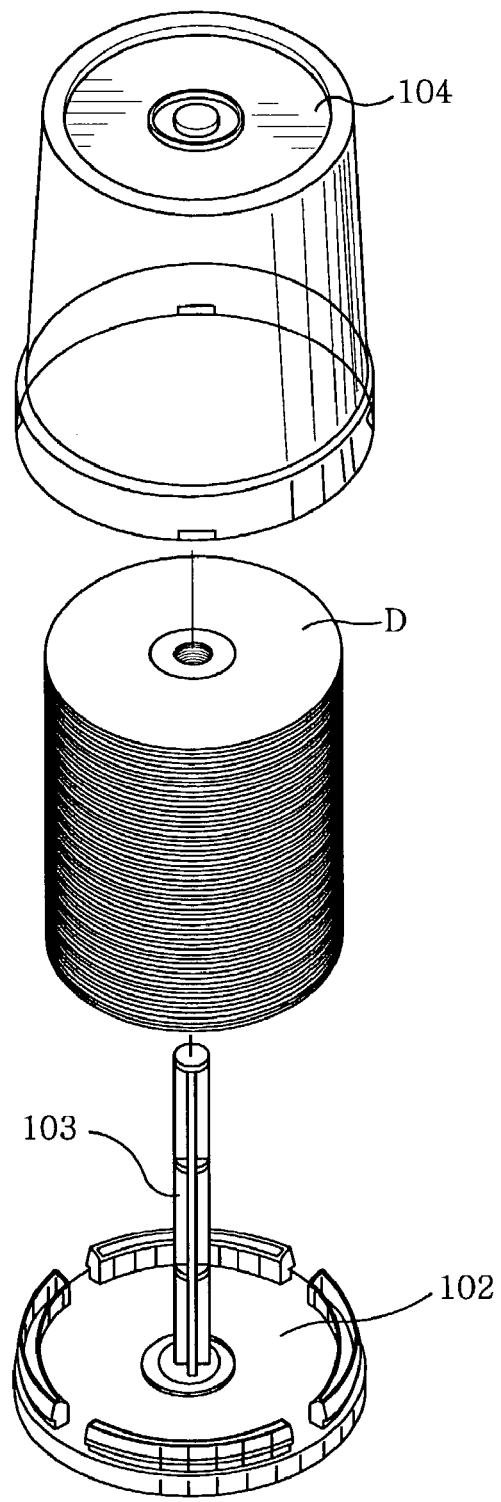
FIG. 27 is an exploded perspective view of a disc package in accordance with a fifth embodiment of the present invention.
Figure 28:
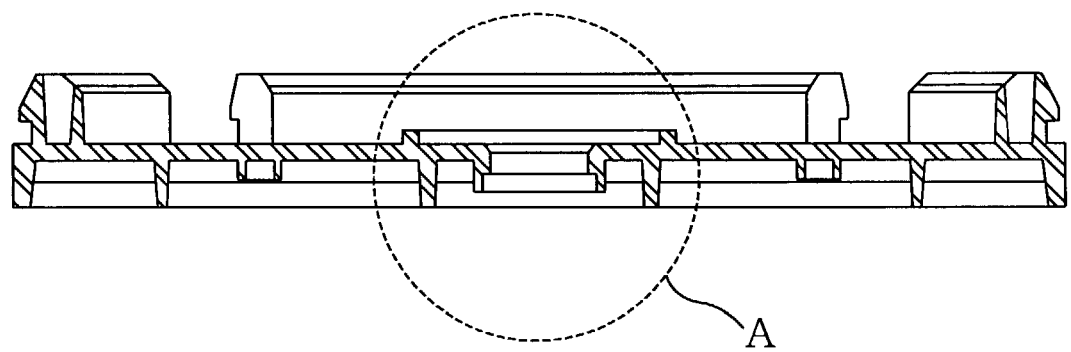
FIG. 28 offers a cross-sectional view of a base shown in FIG. 27.
Figure 29:
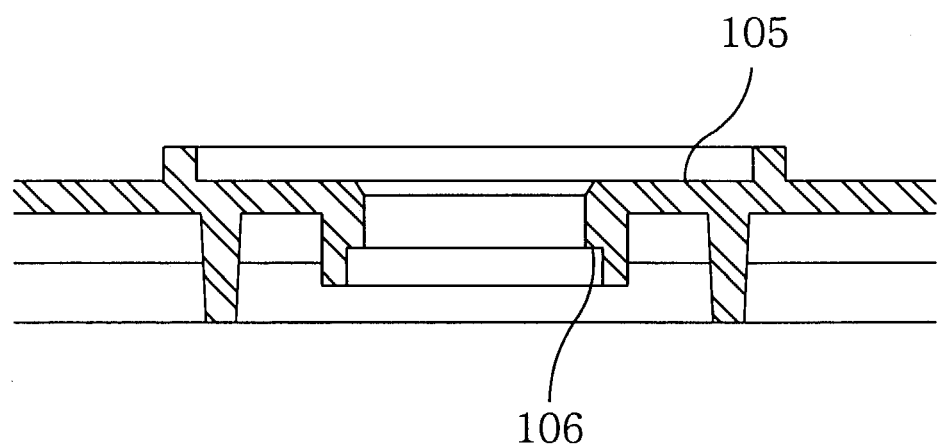
FIG. 29 sets forth an enlarged view of a portion A shown in FIG. 28.
Figure 30:
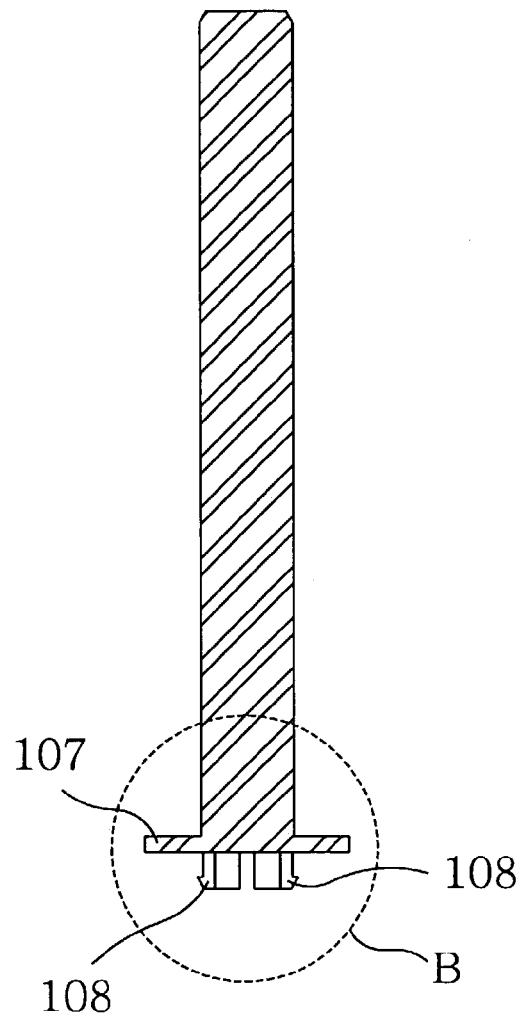
FIG. 30 demonstrates a cross-sectional view of a shaft shown in FIG. 27.
Figure 31:
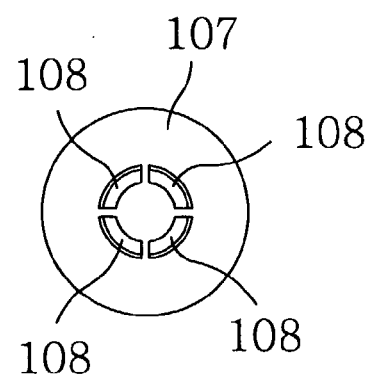
FIG. 31 illustrates a bottom view of the shaft 103 shown in FIG. 30.
Figure 32:
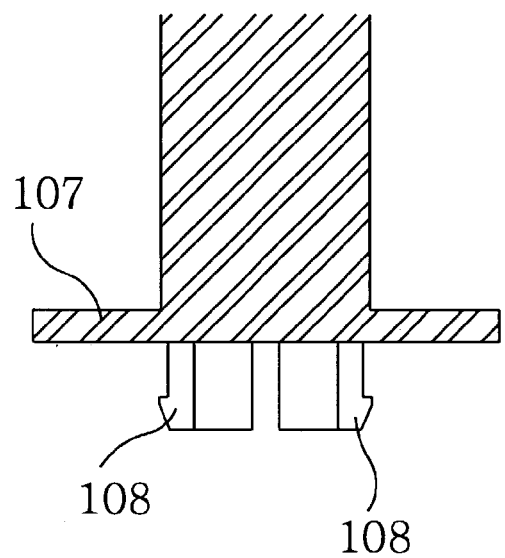
FIG. 32 provides an enlarged view of a portion B shown in FIG. 30.

FIG. 27 describes an exploded perspective view of a disc package in a fifth preferred embodiment of the present invention. In FIG. 27, reference D represents discs; 102, a disc-shaped base for mounting thereon the discs D; 103, a shaft for aligning a plurality of discs D stacked as multiple layers on the base 102; and 104, a bucket-shaped cover. FIG. 28 depicts a cross-sectional view of the base 102 shown in FIG. 27. FIG. 29 shows an enlarged view of a portion A shown in FIG. 28. FIG. 30 presents a sectional view of the shaft 103 shown in FIG. 27. FIG. 31 offers a bottom view of the shaft 103. FIG. 32 illustrates an enlarged view of a portion B shown in FIG. 30. In FIGS. 28 to 32, the shaft 103 is installed on the base 102 having a top surface 105 and a bottom surface 106. A flange 107 makes contact with the top surface 105 to vertically install the shaft 103 on the base. A coupling click 108 is coupled to the bottom surface 106 to prevent the shaft 103 from being separated from the base 102.

Figure 33:
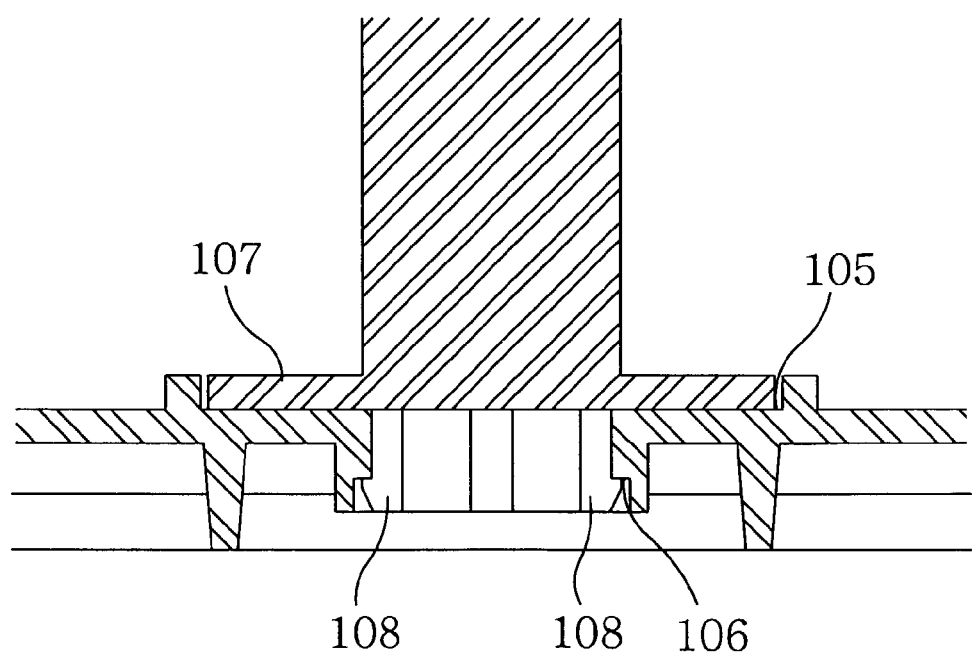
FIG. 33 describes an enlarged cross-sectional view of the shaft installed on the base.

FIG. 33 sets forth an enlarged cross-sectional view of the shaft 103 installed on the base 102. When the shaft 103 is installed on the base 102, the coupling click 108 is first elastically deformed inwardly, i.e., in a shaft axial direction. Then, the coupling click 108 is moved from a top surface portion of the base 102 to a bottom surface portion thereof as shown in FIG. 33. When the coupling click 108 is moved below the bottom surface 106 of the base 102, the inwardly elastically deformed coupling click 108 is restored and then coupled to the bottom surface 106 of the base as shown in FIG. 33. As a result, the shaft 103 installed on the top surface 105 of the base is prevented from being separated therefrom. In other words, in the fifth preferred embodiment, the shaft 103 is installed on the base 102 by a snap fit using an elastic pin.

Figure 34:
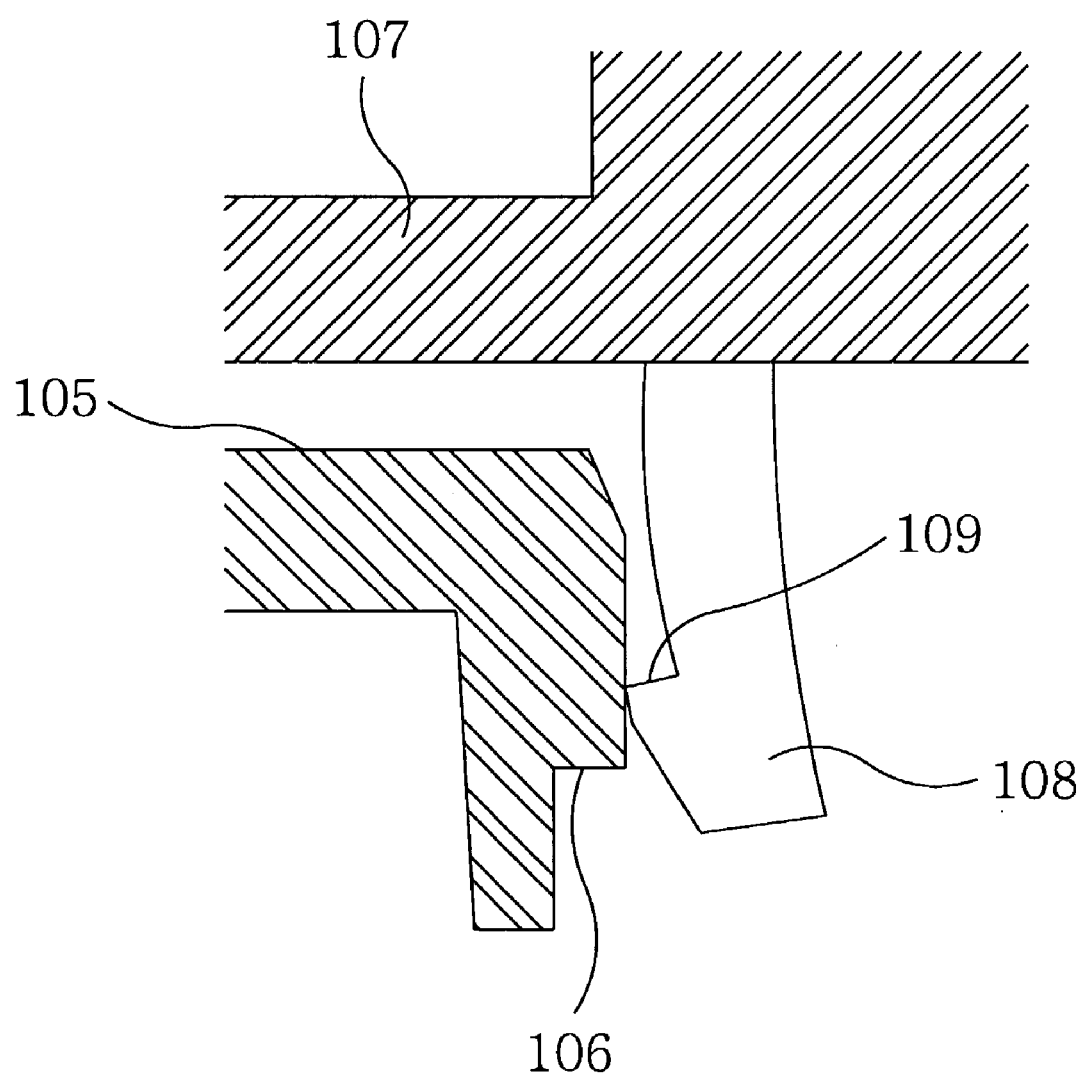
FIG. 34 illustrates an enlarged cross-sectional view of a coupling click while the shaft is being installed on the base.
Figure 35:
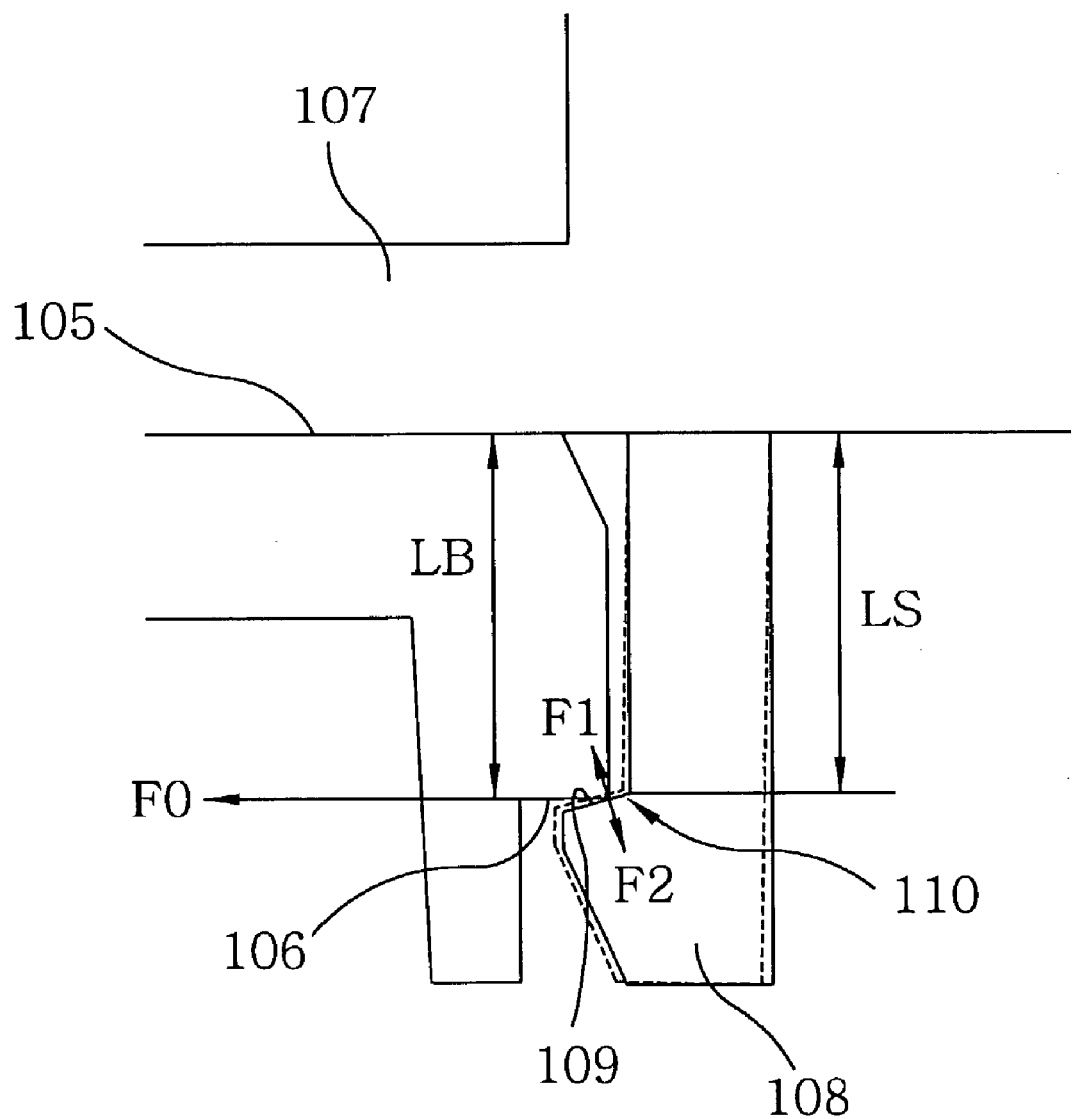
FIG. 35 demonstrates an enlarged cross-sectional view of the coupling click when the shaft is completely installed on the base.

FIG. 34 is an enlarged cross-sectional view of the coupling click when the shaft is being installed on the base. FIG. 35 shows an enlarged cross-sectional view of the coupling click after the shaft is installed on the base. In FIGS. 34 and 35, a tapered surface 109 is formed at the coupling click 108 having a bottom portion 110. As shown in FIG. 34, when the shaft 103 is being installed on the base 102, the coupling click 108 is being elastically deformed and therefore tends to restore to an original position, i.e., a position in which the shaft is not deformed.

As shown in FIG. 35, in the fifth preferred embodiment, the coupling click 108 is not completely restored to the original position (a position illustrated in dashed line in FIG. 35). Accordingly, the coupling click 108 exerts its restoring force against the base 102. Further, the coupling surface 109 is not parallel to the bottom surface 106 of the base, but is inclined in a tapered-shape. Moreover, a distance LS between the bottom portion 110 of the coupling surface 109 and the flange 107 is smaller than a thickness of the base LB supported between the flange 107 and the coupling click 108. Therefore, a position of the tapered surface 109 of the coupling click 108 is in contact with a corner portion of the bottom surface 106 of the base. As a result, the coupling click 108 exerts an upward component force F1 to the base 102. In other words, the shaft 103 having the coupling click 108 becomes subject to a downward repulsive force F2, so that the flange 107 is in a pressurized contact with the top surface 105 of the base 102.

That is to say, as shown in FIG. 35, when the shaft 103 is installed on the base 102, a wedge-shaped coupling click 108 is pressurized to the bottom surface 106 of the base by the restoring force of the elastically deformed coupling click 108. Accordingly, the flange 107 is pressurized to the top surface 105 of the base 102. In other words, the shaft 103 can be firmly installed on the base 102 by erecting the shaft 103. Further, a rotation of the shaft 103 about the base 102 can be prevented while the disc package is being transported.

In the fifth preferred embodiment, the tapered surface 109 is adjusted in manufacturing a mold for molding a shaft 103. Specifically, the adjustment is performed as actual sizes of the base 102 and the shaft 103 molded by the mold are checked.

Figure 36:
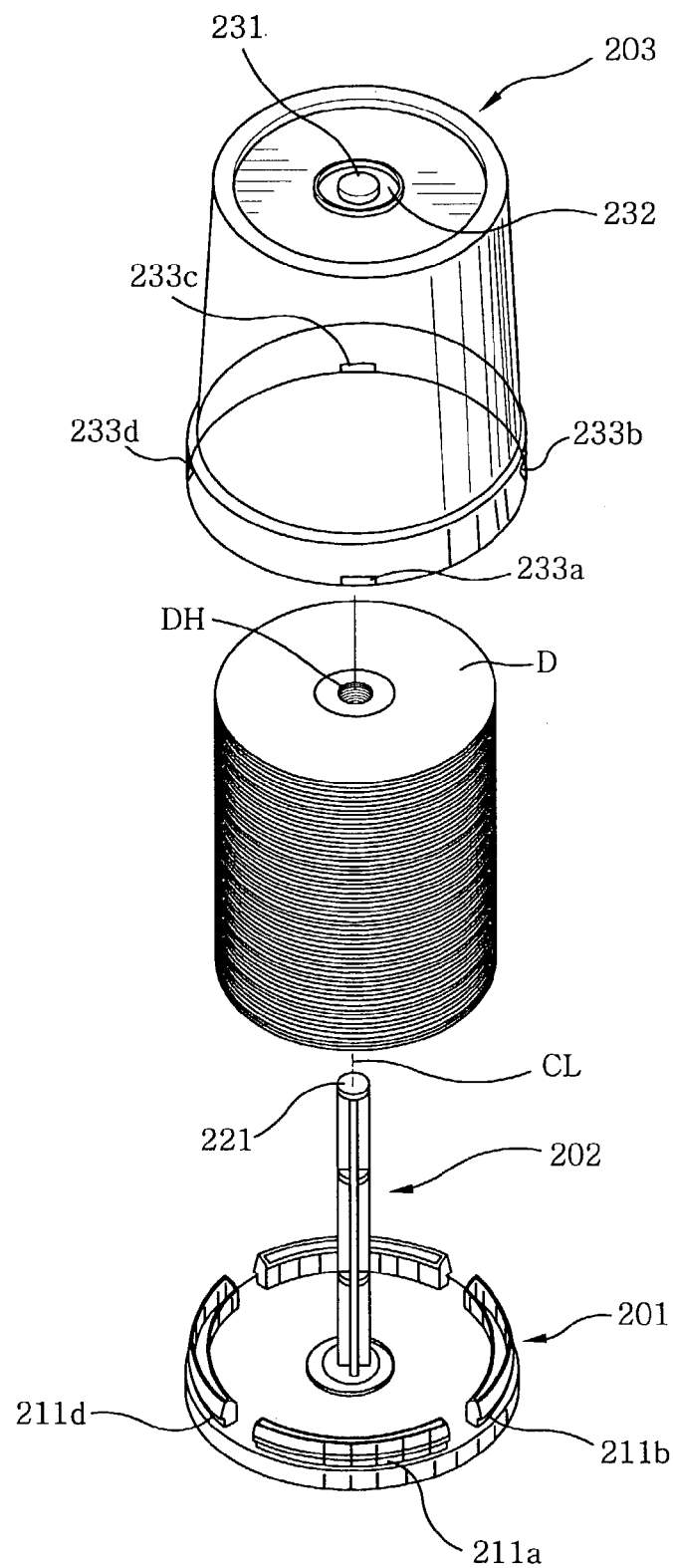
FIG. 36 is an exploded perspective view of a disc packaged in accordance with a sixth embodiment of the present invention.
Figure 37:
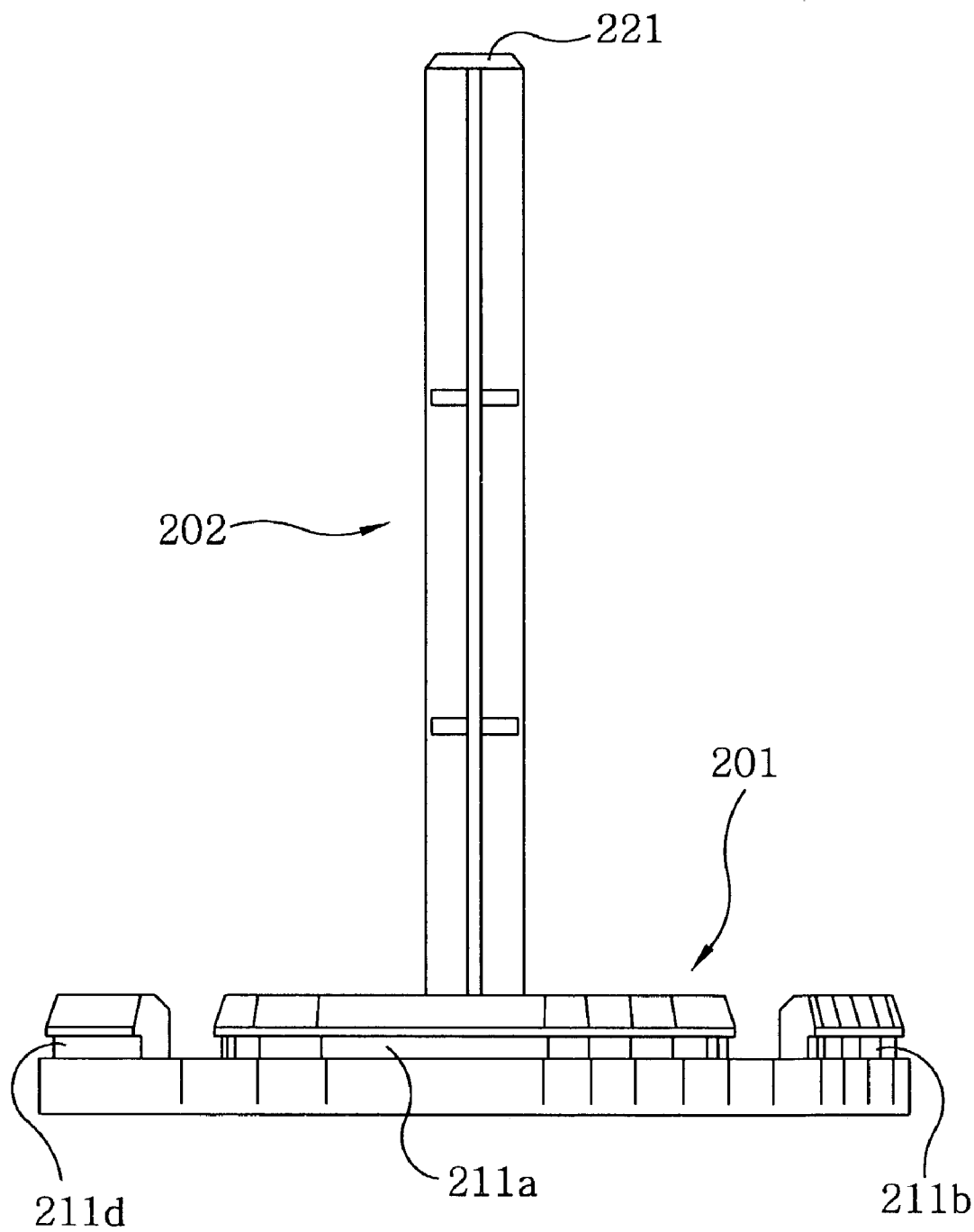
FIG. 37 provides a side view of a base and a shaft shown in FIG. 36.
Figure 38:
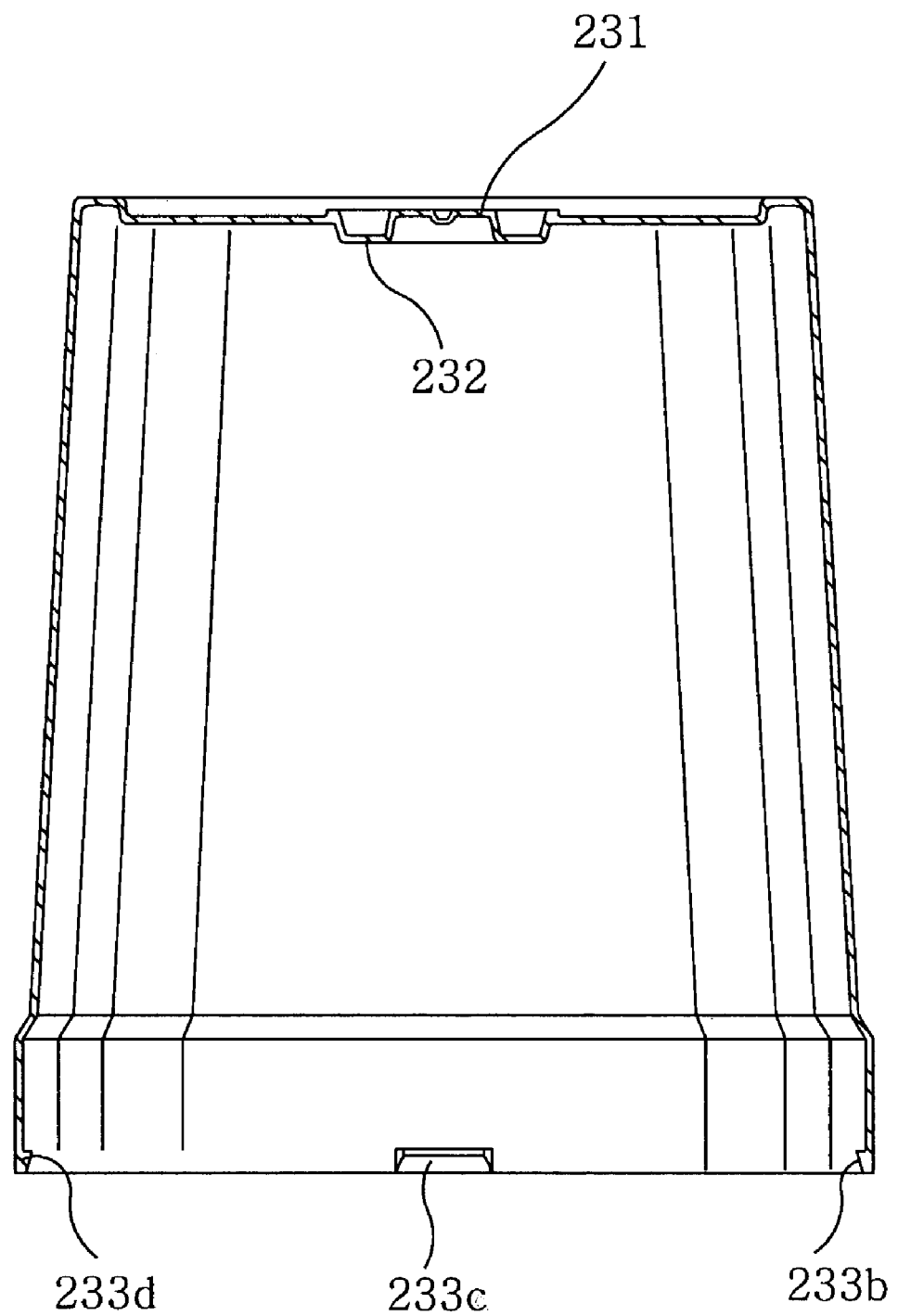
FIG. 38 illustrates a cross-sectional view of a cover shown in FIG. 36.

FIG. 36 represents an exploded perspective view of a disc package in a sixth preferred embodiment of the present invention. In FIG. 36, reference 201 denotes a disc-shaped base for mounting thereon a plurality of discs D; 202, a shaft installed on the base 201 for aligning the plurality of discs D stacked on the base 201; 203, a bucket-shaped cover for covering the discs D mounted on the base 201; 211*a* to 211*d* (211*c*: not shown), coupling grooves formed at the base 201; 221, a top end portion of the shaft 202; 231, a concave portion to be fitted into the top end portion 221 of the shaft 202 when the cover 203 is fixed on the base 201; 232, a convex portion disposed at a peripheral portion of the concave portion 231; 233*a* to 233*d*, coupling protruded portions to be coupled to the coupling grooves 211*a* to 211*d*; DH, a disc center hole; and CL, a central axial line of the cover 203. FIG. 37 provides a side view of the base 201 and the shaft 202 shown in FIG. 36. FIG. 38 describes a cross-sectional view of the cover shown in FIG. 36. FIGS. 39 to 41 depict enlarged views of the coupling protruded portion 233*a* and the coupling groove 211*a* and the like shown in FIG. 36.

As shown in FIG. 36, in the disc package of the sixth preferred embodiment, the coupling grooves 211*a* to 211*d* to be respectively coupled with the coupling protruded portions 233*a* to 233*d* by a snap fit using an elastic deformation of the cover 203 are formed at the base 201 and the cover 203, respectively.

Figures 41A, 41B, 41C:
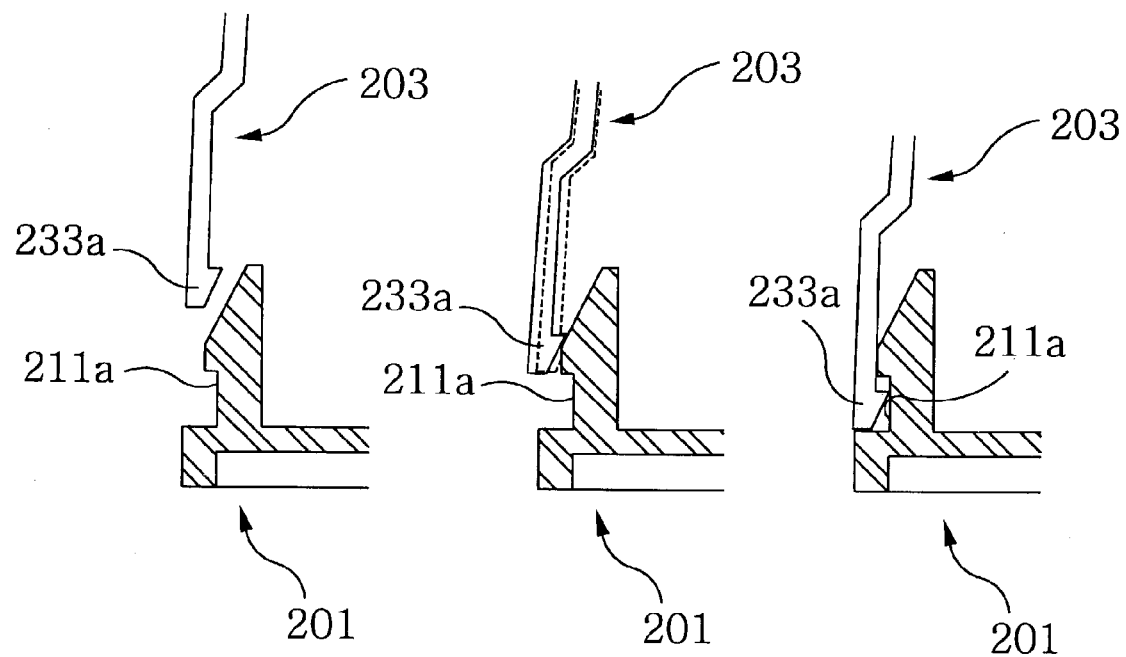
FIGS. 41A to 41C describe a snap-fit locking mechanism of the disc package shown in FIG. 36.

Further, as illustrated in FIGS. 36, 40 and 41, the cover 203 can be mounted on the base 201 simply by pressurizing the cover 203 against the base 201 in a central axial line (CL) direction, without rotating the cover 203 along the circumference of the base 201. In other words, when the cover 203 is mounted on the base 201, the cover 203 is simply pressurized onto the base 201 and as shown in FIG. 40, the coupling protruded portion 233*a* is moved to a position of 233*a'* without being rotated against the base 201. Further, as illustrated in FIG. 41B in detail, the cover 203 is elastically deformed and the coupling protruded portions 233*a* to 233*d* are coupled to the coupling grooves 211*a* to 211*d*.

However, if the cover 203 is configured to be pressurized onto the base 201 to be mounted thereon, there may happen two cases: one is that the cover 203 is pressurized onto the base 201 without an inclination and the other is with a slight inclination.

Figure 42:
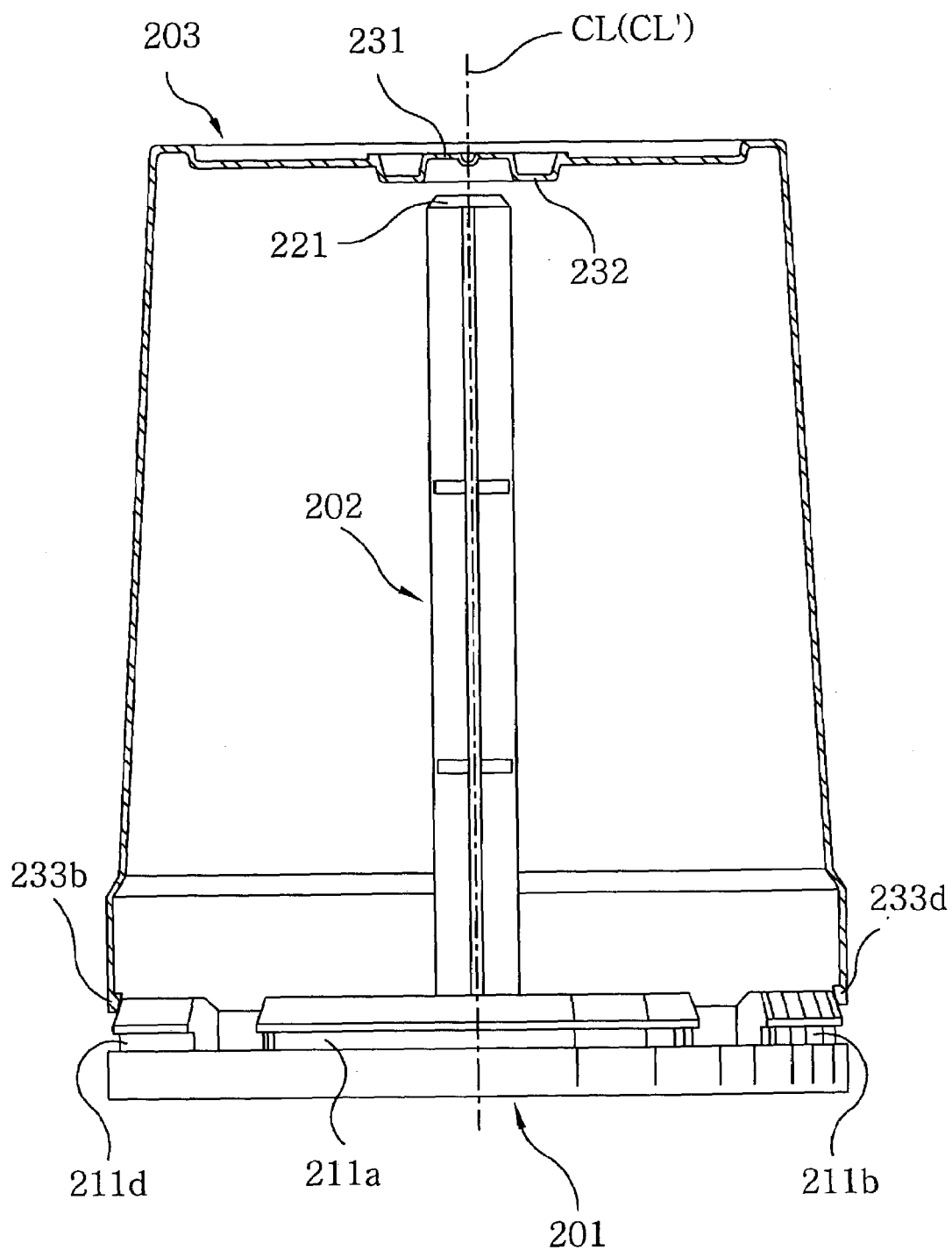
FIG. 42 shows a condition where the cover is pressurized onto the base without being inclined against the base and the shaft.
Figure 43:
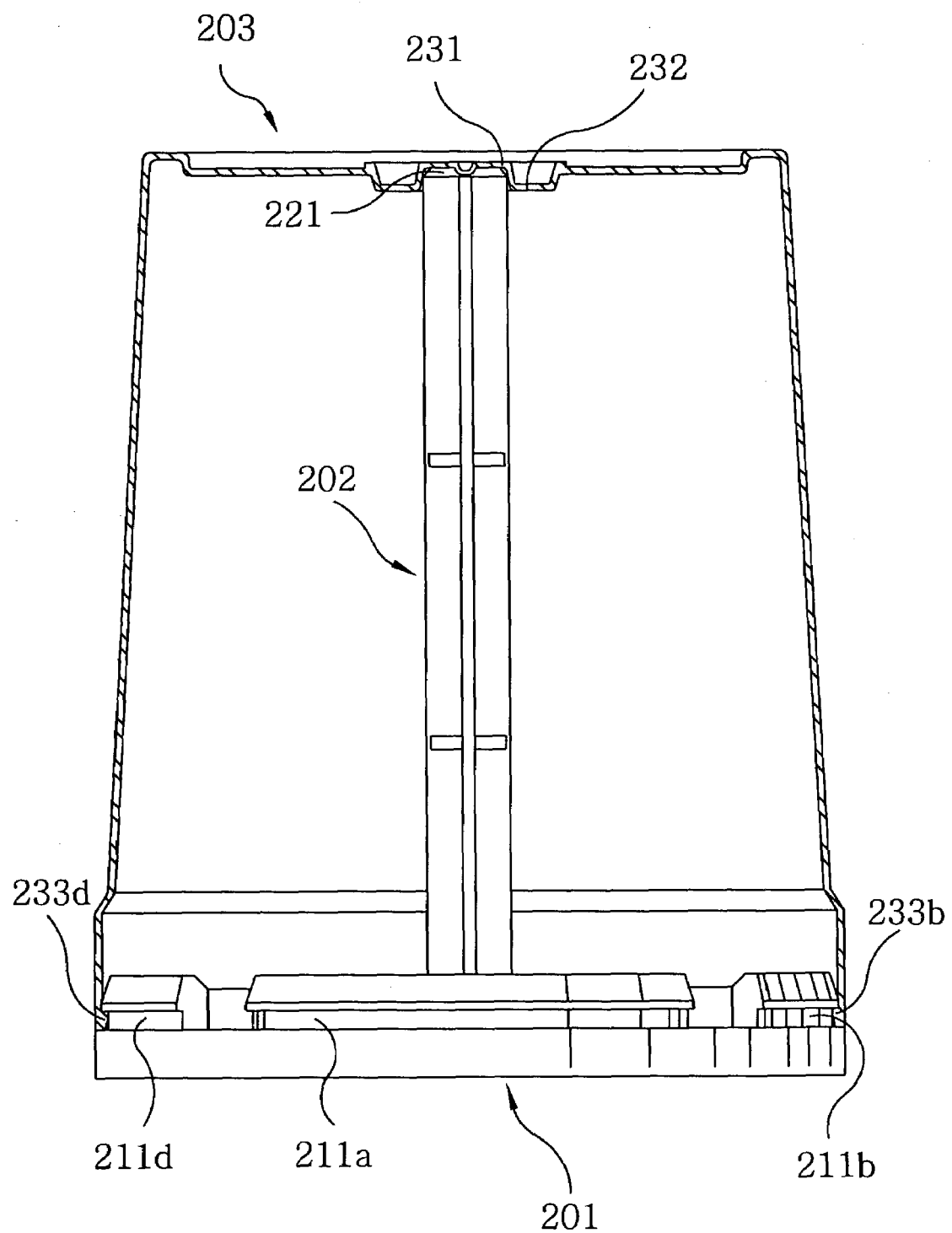
FIG. 43 illustrates the cover completely coupled to the base.

FIG. 42 shows the first case in which the cover 203 is pressurized onto the base 201 without being inclined with respect to the base 201 and the shaft 202. FIG. 43 illustrates the base 201 and the cover 203 mounted thereon. As shown in FIG. 42, in case the cover 203 is pressurized without being inclined with respect to the base 201 and the shaft 202, i.e., the cover 203 is pressurized onto the base 201 in a condition that a central axial line (CL) of the cover 203 almost corresponds to that CL' of the shaft 202, the top end portion 221 of the shaft 202 meets the concave portion 231. Accordingly, as illustrated in FIG. 43, the top end portion 221 of the shaft 202 can be fitted into the concave portion 231 to be coupled with each other by more pressurizing the cover 203, thereby mounting the cover 203 on the base 201.

Figure 44:
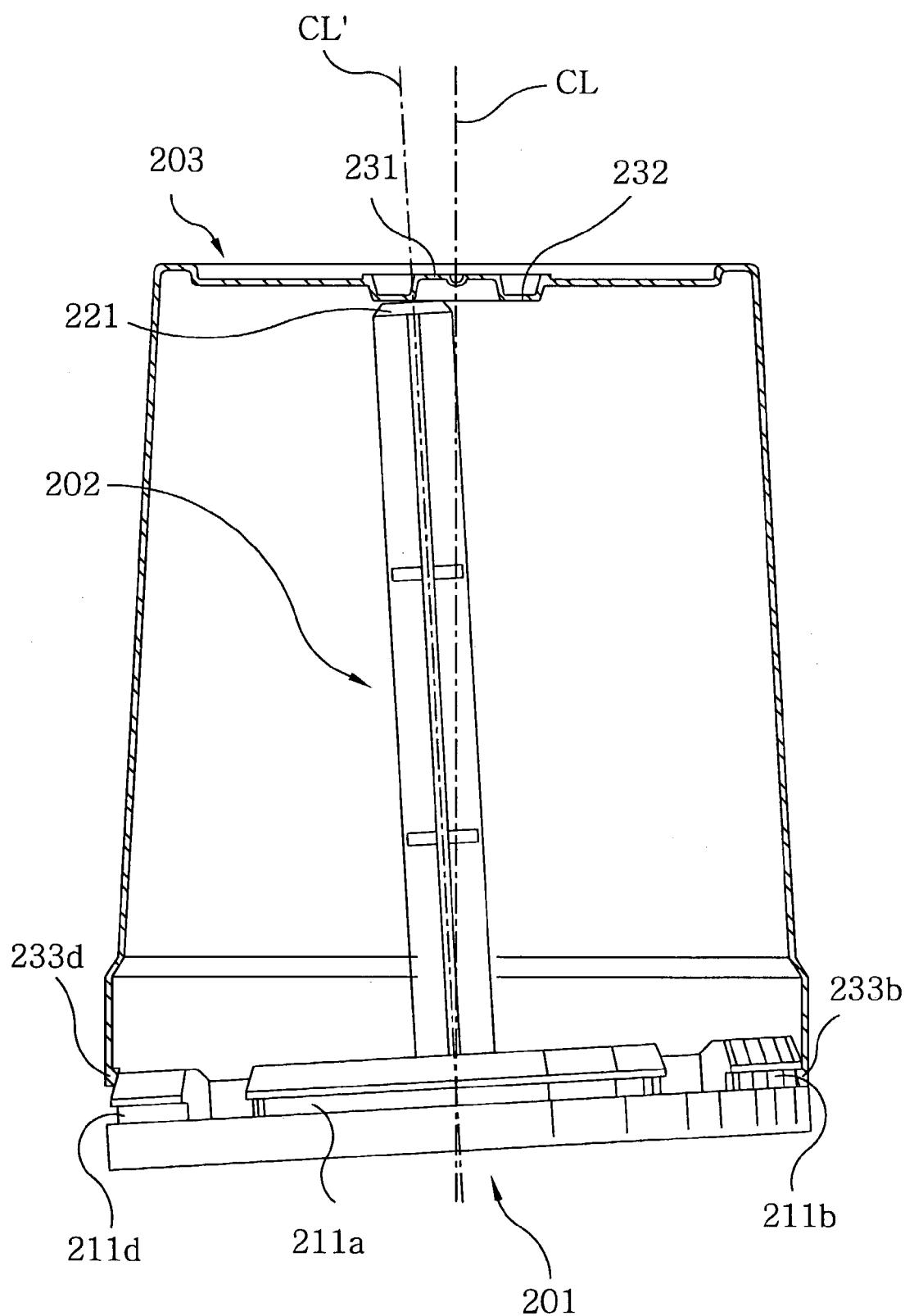
FIG. 44 demonstrates a condition where the cover is pressurized onto the base slightly inclined against the base and the shaft.

FIG. 44 sets forth a condition of the cover 203 with a slight inclination with respect to the base 201 and the shaft 202. In this case, i.e., the cover 203 is pressurized onto the base 201 in a condition that the central axial line CL' of the shaft 202 is slightly inclined with respect to that of the cover 203, the top end portion 221 of the shaft 202 and the concave portion 231 are misaligned. Therefore, the top end portion 221 of the shaft 202 faces to the convex portion 232 located in a peripheral portion of the concave portion 231.

In case the cover 203 is made of relatively hard material as in the disc package shown in Japanese Patent Laid-Open Application No. 2000-168872, when the top end portion 221 of the shaft 202 faces to the convex portion 232 as shown in FIG. 44, a user cannot pressurize the cover 203 onto the base 201 and the shaft 202 anymore. As a result, the top end portion 221 of the shaft 202 cannot be fitted into and coupled to the concave portion 231.

In order to solve the problem, in the sixth preferred embodiment, the cover 203 is set to be elastically deformed by the contact between the top end portion 221 of the shaft 202 and the concave portion 231 to thereby guide the top end portion 221 of the shaft 202 into the concave portion 231.

Figure 45:
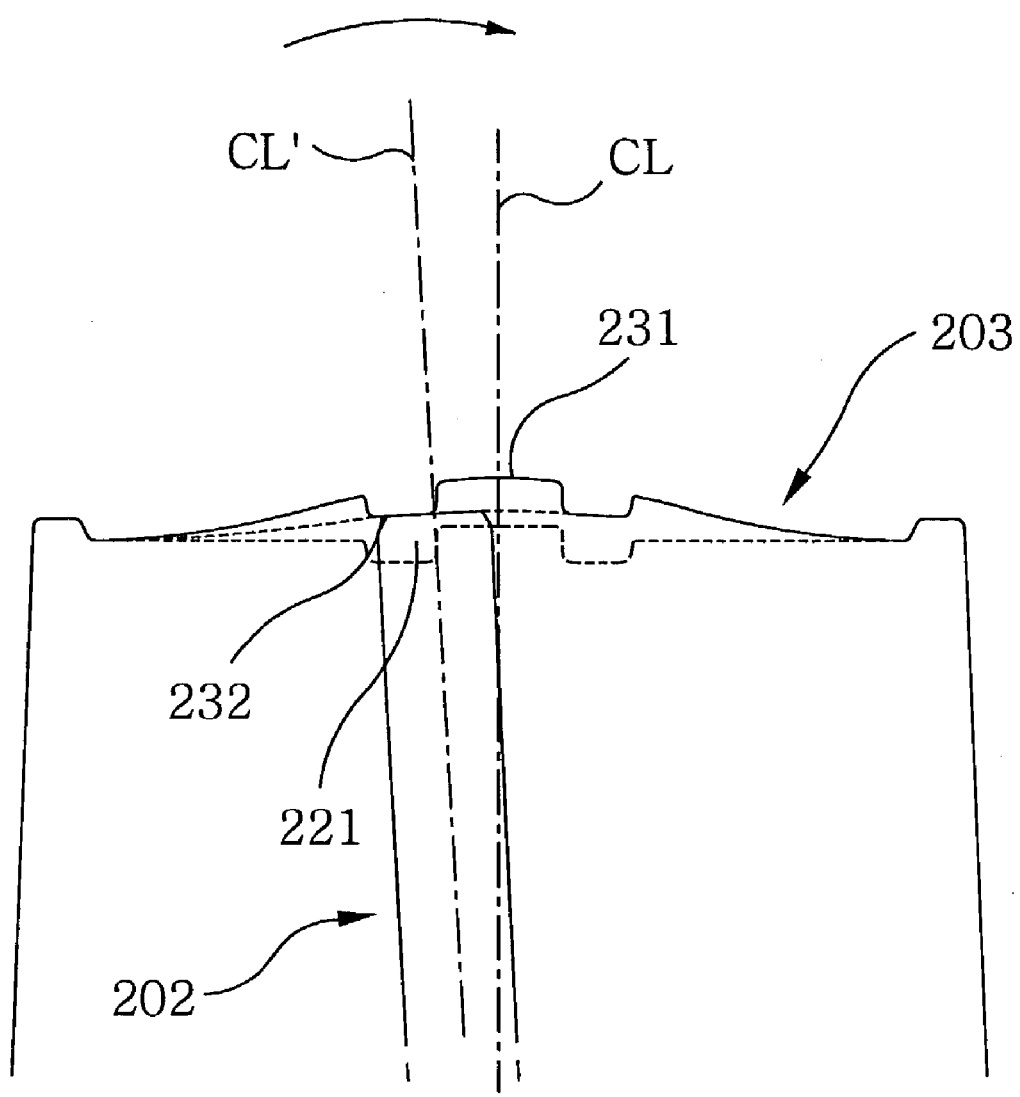
FIG. 45 illustrates a condition where the cover is deformed due to the contact with a top end portion of the shaft.

FIG. 45 provides the cover deformed by a contact between the top end portion 221 of the shaft 202 and the concave portion 231. As shown in FIG. 44, since the material of the cover 203 is more flexible than that of the base 201 and the shaft 202, a user can pressurize the cover 203 onto the base 201 and the shaft 202 even in case the top end portion 221 of the shaft 202 faces to the convex portion 232 in a peripheral portion of the concave portion 231. As a result, as illustrated in FIG. 45, the cover 203 is more pressurized onto the base 201 and the shaft 202 (dashed line→solid line) and therefore, the cover 203 is elastically deformed upwardly in FIG. 45 (dashed line→solid line). Specifically, the concave and the convex portion 231 and 232 are moved upward in FIG. 45. Therefore, the surface of the convex portion 232 bumped with the top end portion 221 of the shaft 202 is deformed into a tapered shape (mortar shape) (see dashed dotted lines in FIG. 45).

Accordingly, as illustrated in an arrow in FIG. 45, the top end portion 221 of the shaft 202 becomes movable to the position of the concave portion 231 along the surface of the tapered-shaped concave portion 232. Then, the top end portion 221 of the shaft 202 is fitted into the concave portion 231 to be coupled with each other, and therefore, the deformed cover 203 is restored. That is to say, as shown in FIG. 43, the cover 203 is mounted on the base 201.

In other words, in accordance with the sixth preferred embodiment of the present invention, even in case the top end portion 221 of the shaft 202 faces to the convex portion 231 located in a peripheral portion of the concave portion 231 due to the dislocation therebetween, the top end portion 221 of the shaft 202 can be fitted into the concave portion 231 to be coupled with each other simply by pressurizing the cover 203 onto the base 201 and the shaft 202. As a result, the cover 203 is firmly mounted on the base 201.

Further, in the sixth preferred embodiment, the top end portion 221 of the shaft 202 is chamfered (see FIG. 37) and the inner circumferential surface of the concave portion 231 is in a tapered shape (see FIG. 38) to make an easy coupling between the top end portion 221 of the shaft 202 and the concave portion 231.

Still further, the shaft 202 is set to be taken out of the mold in a radial direction thereof. In case the shaft 202 is molded as a hollow stick, the shaft 202 is taken out in a vertical direction thereof, which increases the costs for processing and molding the shaft. Therefore, in the sixth preferred embodiment of the present invention, the shaft is taken out from the mold in a radial direction thereof to decrease the movements of the mold.

While the invention has been shown and described with respect to the preferred embodiments, it will be understood by those skilled in the art that various changes and modifications may be made without departing from the spirit and scope of the invention as defined in the following claims.

What is claimed is:

1. A disc package comprising:
   a base for accommodating thereon one or more stacked discs; and
   a bucket-shaped cover configured to engage with the base to cover any discs accommodated on the base,
   wherein when the cover is engaged on the base, the cover may be separated from the base by rotating the cover along a circumference of the base in either of a clockwise or a counterclockwise direction, wherein a plurality of coupling groove portions are formed on the base and a corresponding number of protruded portions are formed on the bucket-shaped cover, and wherein the bucket-shaped cover is fixed on the base by elastically deforming the protruded portions to thereby allow each of the protruded portions to be engaged with a corresponding one of the coupling groove portions.

2. The disc package of claim 1, wherein formed at the base next to each of the coupling groove portions is a pull-out groove portion through which an engaged protruded portion is taken out of a corresponding one of the coupling groove portions.

3. The disc package of claim 1, wherein the cover is made of a material more flexible than that for the base.

4. The disc package of claim 1, wherein a tapered surface is formed on the cover in order to facilitate an elastic deformation of the cover being fixed on the base.

5. The disc package of claim 1, wherein the base is provided with coupling regions, each having a coupling groove portion to be coupled with the protruded portions, and non-coupling regions without a coupling groove portion, and wherein a boundary region is provided between neighboring coupling regions and non-coupling regions, the boundary region allows a user to recognize that the protruded portions move from the coupling regions to the non-coupling regions while the cover is being rotated along the circumference of the base.

6. The disc package of claim 5, wherein a rotation resistance modification means, which modifies the rotation resistance of the cover against the base when a protruded portion passes through the boundary region, is provided at the boundary region, allowing the user to recognize that the protruded portions move from the coupling regions to the non-coupling regions.

7. The disc package of claim 6, wherein the modification means is a protrusion.

8. The disc package of claim 1 further comprising a shaft for aligning a plurality of discs to be mounted on the base and a concave portion formed at the cover to be fitted into and coupled with a top end portion of the shaft when the cover is mounted on the base, wherein the cover is deformed by the contact between the top end portion of the shaft and the concave portion when the top end portion and the concave portion are misaligned to thereby guide the top end portion of the shaft into the concave portion.

9. The disc package of claim 8, wherein a convex portion is provided around the concave portion and when the cover is deformed due to the contact between the convex portion and the top end portion of the shaft, the convex portion becomes tapered to allow the top end portion of the shaft to move toward the concave portion of the cover.

10. The disc package of claim 8, wherein the cover is made of a material more flexible than those for the base and the shaft.

11. The disc package of claim 9, wherein the cover is made of a material more flexible than those for the base and the shaft.

12. A disc package comprising:
   a base for accommodating thereon one or more stacked discs; and
   a bucket-shaped cover configured to engage with the base to cover any discs accommodated on the base,
   wherein when the cover is engaged on the base, the cover may be separated from the base by rotating the cover along a circumference of the base in either of a clockwise or a counterclockwise direction, wherein an annular coupling groove portion is formed at the base and a plurality of elastic pieces at the cover, each of the elastic pieces having a protruded portion to be fitted into the annular coupling groove portion, and wherein the cover is fixed on the base by elastically deforming the elastic pieces and allowing the protruded portions of the elastic pieces to be fitted into the annular coupling groove portion.

13. The disc package of claim 12, wherein a plurality of pull-out grooves are prepared at the base, each pull-out groove corresponding to one of the elastic pieces and connected to the annular coupling groove portion, the pull-out grooves being used to take out the fitted protruded portions from the annular coupling groove.

14. The disc package of claim 12, wherein the cover is made of a material more flexible than that for the base.

15. The disc package of claim 12, wherein a tapered surface is formed on the base in order to facilitate an elastic deformation of the cover being fixed on the base.

16. A disc package comprising:
   a base for accommodating thereon one or more stacked discs; and
   a bucket-shaped cover configured to engage with the base to cover any discs accommodated on the base,
   wherein when the cover is engaged on the base, the cover may be separated from the base by rotating the cover along a circumference of the base in either of a clockwise or a counterclockwise direction, and the cover once fixed on the base is not separable therefrom unless rotated along the circumference of the base, whereas the cover is fastened to the base by merely pressurizing the cover with respect to the base in a direction normal to an upper surface of the base without rotating the cover along the circumference of the base.

17. The disc package of claim 16, wherein the cover is made of a material more flexible than that for the base.

18. The disc package of claim 16, wherein a tapered surface is formed on the base in order to facilitate an elastic deformation of the cover being fixed on the base.

* * * * *